(12) United States Patent
Hayashida et al.

(10) Patent No.: US 10,870,181 B2
(45) Date of Patent: Dec. 22, 2020

(54) JIG FOR ATTACHING AND REMOVING FASTENING BOLT FOR CARRIER AND LOWER ARM OF VEHICLE, AND METHOD FOR ATTACHING AND REMOVING FASTENING BOLT USING JIG

(71) Applicant: TOYOTA JIDOSHA KABUSHIKI KAISHA, Toyota (JP)

(72) Inventors: Kosuke Hayashida, Toyota (JP); Masaya Shimizu, Miyoshi (JP); Kanta Hattori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 16/125,015

(22) Filed: Sep. 7, 2018

(65) Prior Publication Data
US 2019/0091815 A1 Mar. 28, 2019

(30) Foreign Application Priority Data
Sep. 27, 2017 (JP) .................................. 2017-185527

(51) Int. Cl.
| | |
|---|---|
| B23P 19/06 | (2006.01) |
| B60G 3/20 | (2006.01) |
| B60G 11/14 | (2006.01) |
| B25B 27/00 | (2006.01) |

(Continued)

(52) U.S. Cl.
CPC .............. *B23P 19/06* (2013.01); *B25B 11/02* (2013.01); *B25B 27/0035* (2013.01); *B60G 3/20* (2013.01); *B60G 11/14* (2013.01); *B23P 2700/14* (2013.01); *B60G 2204/1244* (2013.01); *B60G 2204/148* (2013.01); *B60G 2204/41* (2013.01); *B60G 2206/162* (2013.01)

(58) Field of Classification Search
CPC ...... B23P 19/06; B23P 2700/14; B25B 27/00; B25B 27/0035; B25B 11/02; B60G 3/20; B60G 11/14; B60G 2204/148; B60G 2204/41; B60G 2204/1244; B60G 2206/162; B60G 2206/92; B60G 7/00
See application file for complete search history.

(56) References Cited

U.S. PATENT DOCUMENTS

2006/0175788 A1\* 8/2006 Nuno ...................... B60G 3/20
280/124.153

FOREIGN PATENT DOCUMENTS

| JP | H07-117429 A | 5/1995 |
|---|---|---|
| JP | H07117429 B2 \* | 12/1995 |
| JP | 4569963 B2 | 10/2010 |

(Continued)

*Primary Examiner* — Bayan Salone
(74) *Attorney, Agent, or Firm* — Oliff PLC

(57) ABSTRACT

A jig for assisting attachment and removal of a bolt, the bolt being inserted into a center hole of an inner cylinder included in a carrier bush and bolt holes opposed to each other to fasten a carrier and a lower arm, the bolt holes being provided in the lower arm, the jig having a base held in contact with a bottom surface of the lower arm, a fitting portion provided on the base to position the base with respect to the lower arm, and inner cylinder guides that are penetrable into an inner tip portion of the lower arm, and the inner cylinder guides have support grooves for supporting both ends of the inner cylinder, and a center line of the inner cylinder coincides with a center line of the bolt holes of the lower arm when the support grooves support the inner cylinder.

9 Claims, 20 Drawing Sheets

(51) Int. Cl.
*B25B 11/02* (2006.01)
*B60G 7/00* (2006.01)

(56) References Cited

FOREIGN PATENT DOCUMENTS

JP       2013-209076 A    10/2013
JP        2013209076 A  * 10/2013

* cited by examiner

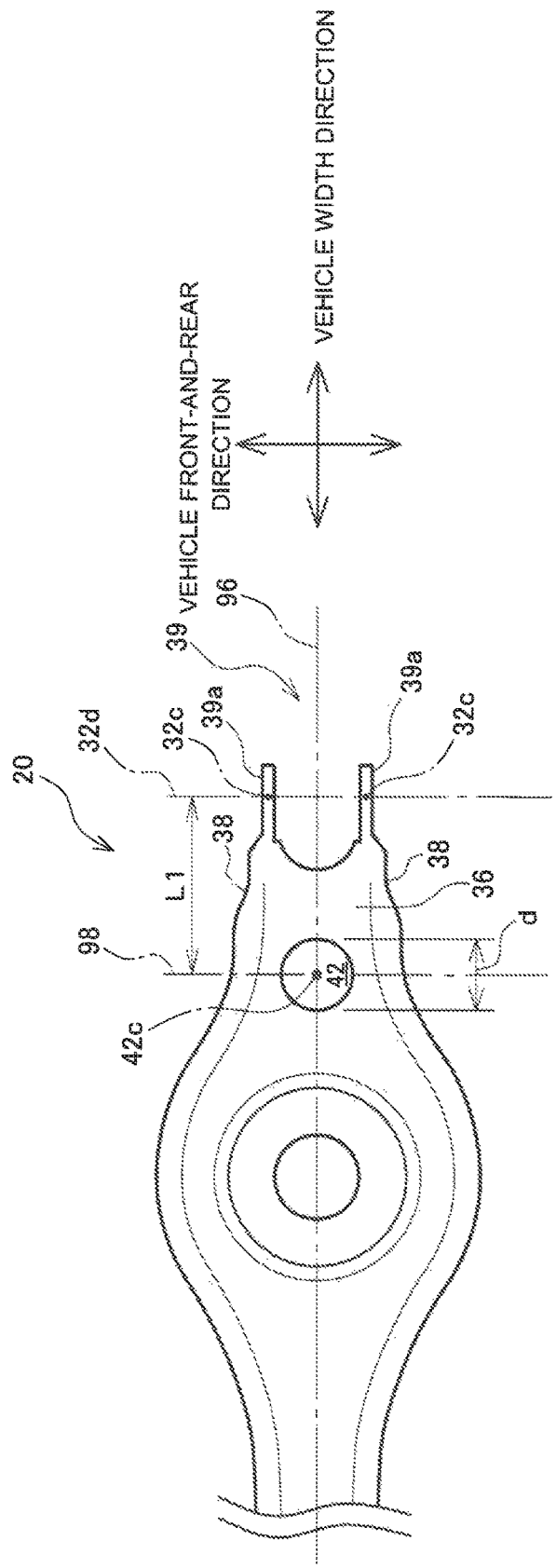
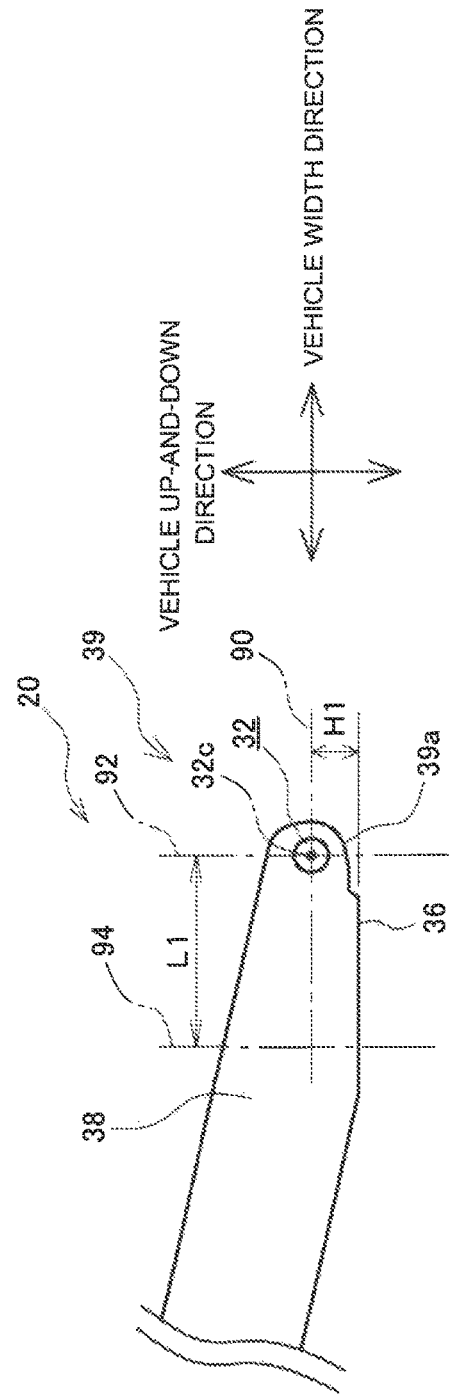
FIG. 2A
FIG. 2B

JIG FOR ATTACHING AND REMOVING FASTENING BOLT FOR CARRIER AND LOWER ARM OF VEHICLE, AND METHOD FOR ATTACHING AND REMOVING FASTENING BOLT USING JIG

CROSS REFERENCE TO RELATED APPLICATION

The disclosure of Japanese Patent Application No. 2017-185527 filed on Sep. 27, 2017 including the specification, claims, drawings, and abstract is incorporated herein by reference in its entirety.

TECHNICAL FIELD

The present disclosure relates to a jig that assists attachment and removal of a bolt for fastening a carrier and a lower arm constituting a suspension of a vehicle, and to a method of attaching and removing the bolt using this jig.

BACKGROUND

As a suspension system for a vehicle, a double wishbone suspension is widely used. For example, the double wishbone suspension disclosed in Japanese Patent No. 4569963 is configured to include a carrier for holding a wheel, a lower arm for connecting the carrier and a suspension member, and a coil spring sandwiched between a vehicle body and the lower arm.

In this suspension structure, a lower end side of a coil spring or a shock absorber extending in the vehicle up-and-down direction is supported by the lower arm. This lower arm has a vehicle width direction inner end portion attached to the suspension member, and a vehicle width direction outer end portion attached to the carrier for holding the wheel. The carrier has a carrier bush press-fitted into the lower end of the carrier, and the lower arm and the carrier are fastened by inserting a bolt into a center hole of the carrier bush and the bolt holes of the lower arm. An upper arm may be further provided to connect the carrier and the suspension member on the upper side with respect to the lower arm in the vehicle up-and-down direction.

SUMMARY

Technical Problem

Upon replacement or inspection work of the coil spring or the shock absorber in the double wishbone suspension, it is necessary to release bolt fastening described above, extract the bolt from the center hole of the carrier bush and the bolt holes of the lower arm, and release connection between the carrier and the lower arm. At the end of work, it is also necessary to insert the bolt into the center hole of the carrier bush and the bolt holes of the lower arm again to fasten the carrier and the lower arm with the bolt. However, the carrier is sometimes biased by the force from the coil spring and the upper arm in the direction to shift the center hole of the carrier bush with respect to the bolt holes of the lower arm. In this case, the lateral force is applied onto the bolt, and therefore, attachment and removal of the bolt are not easy.

In consideration of the above facts, an object of the present disclosure is to provide a jig that facilitates attachment and removal of the bolt for fastening the carrier and the lower arm, and a method of attaching and removing the bolt using this jig.

Solution to Problem

A jig according to the present disclosure is a jig for assisting attachment and removal of a bolt, the bolt being inserted into a center hole of an inner cylinder included in a carrier bush and bolt holes opposed to each other to fasten a carrier and a lower arm, the inner cylinder being attached to the carrier via a rubber bush, the bolt holes being provided in tip portions of the lower arm that are located on both axial sides of the carrier bush, the jig having a base held in contact with a bottom surface of the lower arm, a fitting portion provided on the base and fitted into a fitting receiving portion of the lower arm to position the base with respect to the lower arm, and inner cylinder guides that stand on both side edges of the base and are penetrable into an inner tip portion of the lower arm, and in this jig, the inner cylinder guides have support grooves for supporting both ends of the inner cylinder, and a center line of the inner cylinder coincides with a center line of the bolt holes of the lower arm when the support grooves support the inner cylinder.

In the present disclosure, with the above jig, by holding the jig in contact with the lower arm, identifying a positional relation between the two of them using the fitting portion, causing, in this state, the pair of inner cylinder guides of the jig to penetrate into both inner side ends of the lower arm, and positioning a virtual center of the inner cylinder guide to a center position of the inner cylinder of the carrier bush, it is possible to cause a center line of the inner cylinder and the bolt holes of the lower arm to easily coincide with each other and easily carry out the operation of attaching and removing the bolt for fastening the carrier and the lower arm.

In the jig according to the present disclosure, the support groove has a virtual center at which, when the outer surface of the inner cylinder contacts the support groove, the distances from a plurality of contact points to the virtual center are equal to the radius of the outer surface of the inner cylinder. The height from the surface of the base to the virtual center may be equal to the height from the bottom surface to the center of the bolt hole of the lower arm, and the longitudinal distance of the base from the fitting portion to the virtual center may be equal to the longitudinal distance of the lower arm from the fitting receiving portion to the center of the bolt hole of the lower arm.

As such, because the height from the surface of the base to the virtual center of the inner cylinder guide is equal to the height from the bottom surface of the lower arm to the center of the bolt hole, and because the longitudinal distance of the base from the fitting portion to the virtual center of the inner cylinder guide is equal to the longitudinal distance of the lower arm from the center of the fitting receiving portion to the center of the bolt hole of the lower arm, when the fitting portion of the base of the jig is fitted into the fitting receiving portion in the bottom surface of the lower arm, the position and direction of the virtual centerline connecting the virtual centers of the pair of support grooves coincide with the position and the direction of the center line connecting the centers of the pair of bolt holes of the lower arm. Because the inner cylinder guides are formed as a pair of plates having the support grooves for supporting the outer surface of the inner cylinder which is exposed from both axial ends of the rubber bush, when the base of the jig is brought in contact with the bottom surface of the lower arm and pushed up from below, the support grooves of the inner cylinder guides support the outer surface of the inner cylinder of the carrier bush from both axial end sides and cause the rubber bush in the carrier bush to bend, thereby allowing the center hole of the inner cylinder of the carrier bush to be parallel to the base surface. Because the virtual center is a point at which, when the outer surface of the inner cylinder contacts the support groove, the distances from contact points thereof to the virtual center are equal to the radius of the outer surface of the inner cylinder, when the outer surface of the inner cylinder of the carrier bush fits into the support grooves of the inner cylinder guides, the position of the virtual center line connecting the virtual centers of the pair of support grooves coincides with the position of the center line of the inner cylinder. The position and the direction of the virtual center line connecting the virtual centers of the pair of support grooves also coincide with the position and the direction of the center line connecting the centers of the pair of the bolt holes of the lower arm, and therefore, the position and the direction of the center line of the inner cylinder of the carrier bush coincide with the position and the direction of the center line connecting the centers of the pair of bolt holes of the lower arm.

As such, when the position and the direction of the virtual center line connecting the virtual centers of the pair of support grooves coincide with the position and the direction of the center line connecting the centers of the pair of the bolt holes of the lower arm, and when the position and the direction of the virtual center line connecting the virtual centers of the pair of support grooves coincide with the position and the direction of the center line of the inner cylinder of the carrier bush, the position and the direction of the center line of the inner cylinder of the carrier bush coincide with the position and the direction of the center line connecting the centers of the pair of bolt holes of the lower arm, and the bolt can be easily inserted into the center hole of the carrier bush and the bolt holes of the lower arm.

In addition, during the operation of extracting the bolt from the center hole of the carrier bush and the bolt holes of the lower arm, by bringing the base of the jig in contact with the bottom surface of the lower arm and pushing up the base of the jig from below, the support grooves of the inner cylinder guides can support the outer surface of the inner cylinder of the carrier bush from both axial end sides.

It is thus possible to reduce the lateral force applied from the carrier bush to the bolt and extract the bolt easily.

In the jig according to the present disclosure, the support groove may be a U-shaped groove having an arc-shaped bottom portion.

It is thus possible to hold the inner cylinder such that the position of the center hole of the carrier bush coincides with the position of the virtual center of the jig.

In the jig according to the present disclosure, the width of the U-shaped support groove may be increased from the bottom portion toward the opening side.

Thus, when the base of the jig is pushed up from below, it is possible to guide the inner cylinder of the carrier bush to the bottom portion of the support groove, thereby easily guiding the carrier bush such that the position of the center hole of the carrier bush coincides with the position of the virtual center of the jig.

In the jig according to the present disclosure, the support groove may be a V-shaped groove, and the virtual center may be a point at which the distances from two supporting points of the V-shaped groove to the point are equal to the radius of the outer surface of the inner cylinder.

Thus, when the base of the jig is pushed up from below, it is possible to guide the inner cylinder of the carrier bush to the bottom portion of the V-shaped groove, thereby easily guiding the carrier bush such that the position of the center hole of the carrier bush coincides with the position of the virtual center of the jig. In addition, because the two surfaces of the V-shaped groove contact the outer surface of the inner cylinder, the position of the center hole of the carrier bush can be held to coincide with the position of the virtual center of the jig.

In the jig according to the present disclosure, the support groove is a rectangular groove, and the virtual center may be a point at which the distances from a bottom surface and a side surface of the rectangular groove to the point are equal to the radius of the outer surface of the inner cylinder.

Thus, when the base of the jig is pushed up from below, it is possible to support the outer surface of the inner cylinder of the carrier bush by the bottom surface and the side surface of the rectangular groove and prevent the inner cylinder from being shifted in the longitudinal direction of the base.

In the jig according to the present disclosure, the fitting receiving portion may be a lightening hole provided in the bottom surface of the lower arm, and the fitting portion may be a protrusion that is provided on the surface of the base and is inserted into the lightening hole.

Thus, by inserting the protrusion provided on the surface of the base of the jig into the lightening hole provided in the bottom surface of the lower arm, relative movement of the jig with respect to the lower arm can be restricted. In other words, the workability of the operation of attaching and removing the bolt for fastening the carrier and the lower arm can be improved with the simple structure.

In the jig according to the present disclosure, the fitting receiving portion may be a protrusion provided on the bottom surface of the lower arm, and the fitting portion may be a hole that is provided in the surface of the base and is fitted onto the protrusion.

Thus, by fitting the hole provided in the surface of the base of the jig onto the protrusion provided on the bottom surface of the lower arm, relative movement of the jig with respect to the lower arm can be restricted. In other words, the workability of the operation of attaching and removing the bolt for fastening the carrier and the lower arm can be improved with the simple structure.

A method according to the present disclosure is a method of attaching and removing a bolt, the bolt being inserted into a center hole of an inner cylinder included in a carrier bush and bolt holes opposed to each other to fasten a carrier and a lower arm, the inner cylinder being attached to the carrier via a rubber bush, the bolt holes being provided in tip portions of the lower arm that are located on both axial sides of the carrier bush, the jig having a base held in contact with a bottom surface of the lower arm, a fitting portion provided on the base and fitted into a fitting receiving portion of the lower arm to position the base with respect to the lower arm, and inner cylinder guides that stand on both side edges of the base and are penetrable into an inner tip portion of the lower arm, the inner cylinder guides having support grooves for supporting both ends of the inner cylinder, a center line of the inner cylinder coinciding with a center line of the bolt holes of the lower arm when the support grooves support the inner cylinder, after preparation of the jig, the method comprising the steps of attaching the jig by fitting the fitting portion of the jig into the fitting receiving portion of the lower arm, pushing up a back side of the base of the attached jig together with the lower arm with a jack, holding the outer surface of the inner cylinder by the support grooves of the inner cylinder guides, and attaching and removing the bolt while holding the inner cylinder by the support grooves.

With the method of attaching and removing of the bolt according to the present disclosure, when the position and the direction of the virtual center line connecting the virtual centers of the pair of support grooves coincide with the position and the direction of the center line connecting the centers of the pair of the bolt holes of the lower arm, and when the position and the direction of the virtual center line connecting the virtual centers of the pair of support grooves coincide with the position and the direction of the center line of the inner cylinder of the carrier bush, the position and the direction of the center line of the inner cylinder of the carrier bush coincide with the position and the direction of the center line connecting the centers of the pair of bolt holes of the lower arm, and the bolt can be easily inserted into the center hole of the carrier bush and the bolt holes of the lower arm.

In addition, during the operation of extracting the bolt from the center hole of the carrier bush and the bolt holes of the lower arm, by bringing the base of the jig in contact with the bottom surface of the lower arm and pushing up the base of the jig from below, the support grooves of the inner cylinder guides can support the outer surface of the inner cylinder of the carrier bush from both axial end sides.

Thus, with the method of attaching and removing the bolt according to the present disclosure, it is possible to reduce the lateral force applied from the carrier bush to the bolt and extract the bolt easily.

Advantageous Effects of Invention

According to the present disclosure, the operation of attaching and removing the bolt for fastening the carrier and the lower arm can be carried out easily.

BRIEF DESCRIPTION OF DRAWINGS

Embodiments of the present disclosure will be described by reference to the following figures, wherein:

FIG. 2A is a plane view of a lower arm when viewed from the underside;

FIG. 2B is a side view of the lower arm;

DESCRIPTION OF EMBODIMENTS

Suspension

Figure 1:
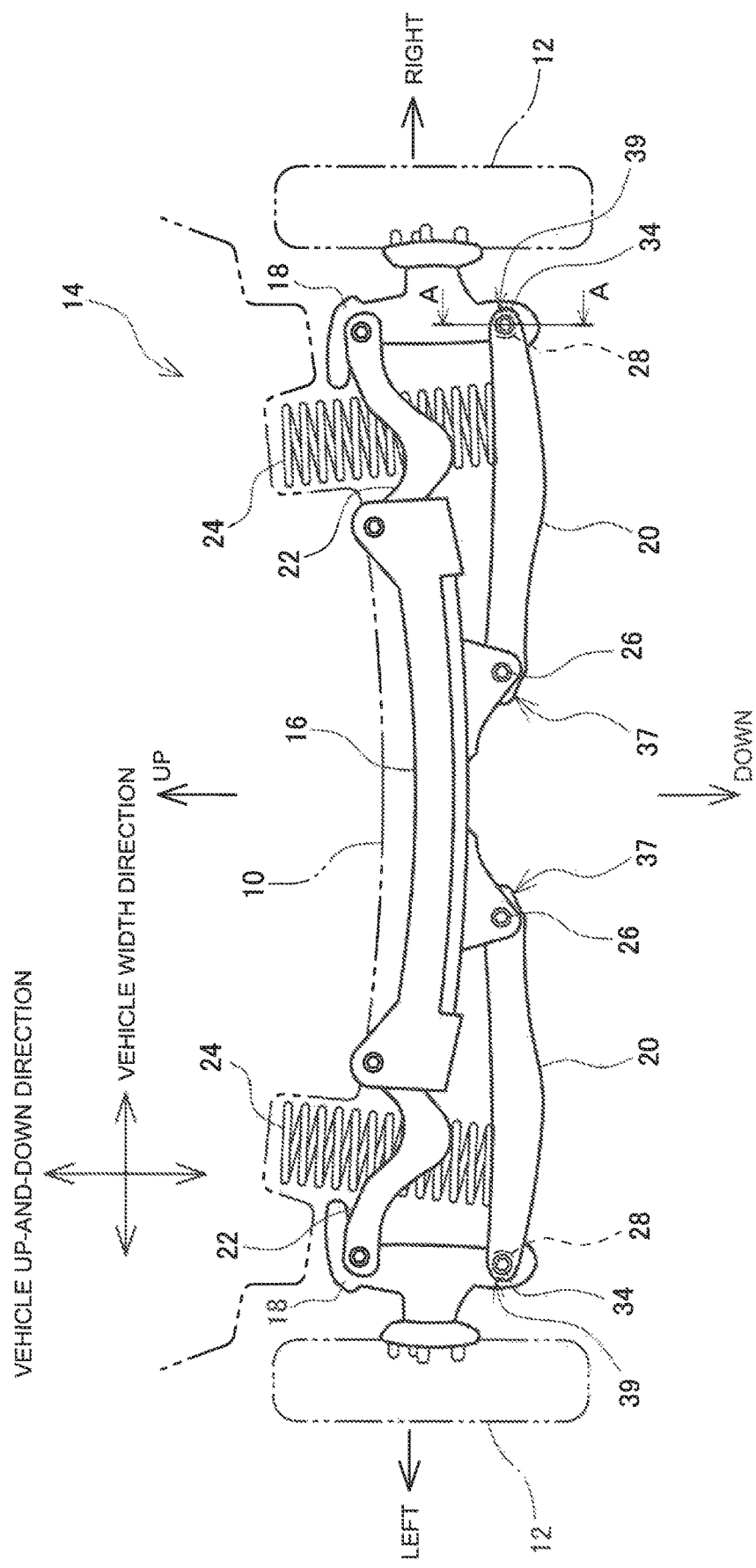
FIG. 1 is a schematic view of a double wishbone suspension when viewed from the front.

Hereinafter, a jig 50 according to an embodiment will be described with reference to the drawings. Prior to explanation of the jig 50, a suspension 14 will be explained. FIG. 1 is a schematic view of a double wishbone suspension 14 mounted between a vehicle body 10 and a wheel 12 in the lower part of the vehicle body 10. This suspension 14 is configured to include a suspension member 16, a carrier 18, a lower arm 20, and an upper arm 22. The suspension member 16 is a rigid member made of, for example, steel material and located in the center portion of the suspension 14. The carrier 18 holds the wheel 12, and the lower arm 20 connects the carrier 18 and the suspension member 16. The upper arm 22 also connects the carrier 18 and the suspension member 16 on the side above the lower arm 20 in the vehicle up-and-down direction. The suspension 14 is configured to further include a coil spring 24, for example. The coil spring 24 is sandwiched between the vehicle body 10 and the lower arm 20, and its lower end side is supported by the lower arm 20. When the vehicle runs, the coil spring 24 converts vibration transmitted from the wheel 12 to elastic energy, and reduces vibration transmitted to the vehicle body 10. In the suspension 14, the lower arm 20 has a vehicle width direction inner end portion 37 rotatably attached to the suspension member 16 with a bolt 26, and a vehicle width direction outer end portion 39 which is, as shown in FIG. 3, rotatably attached to the carrier 18 with a bolt 34 via a carrier bush 28 which will be described later.

Lower Arm

Figure 3:
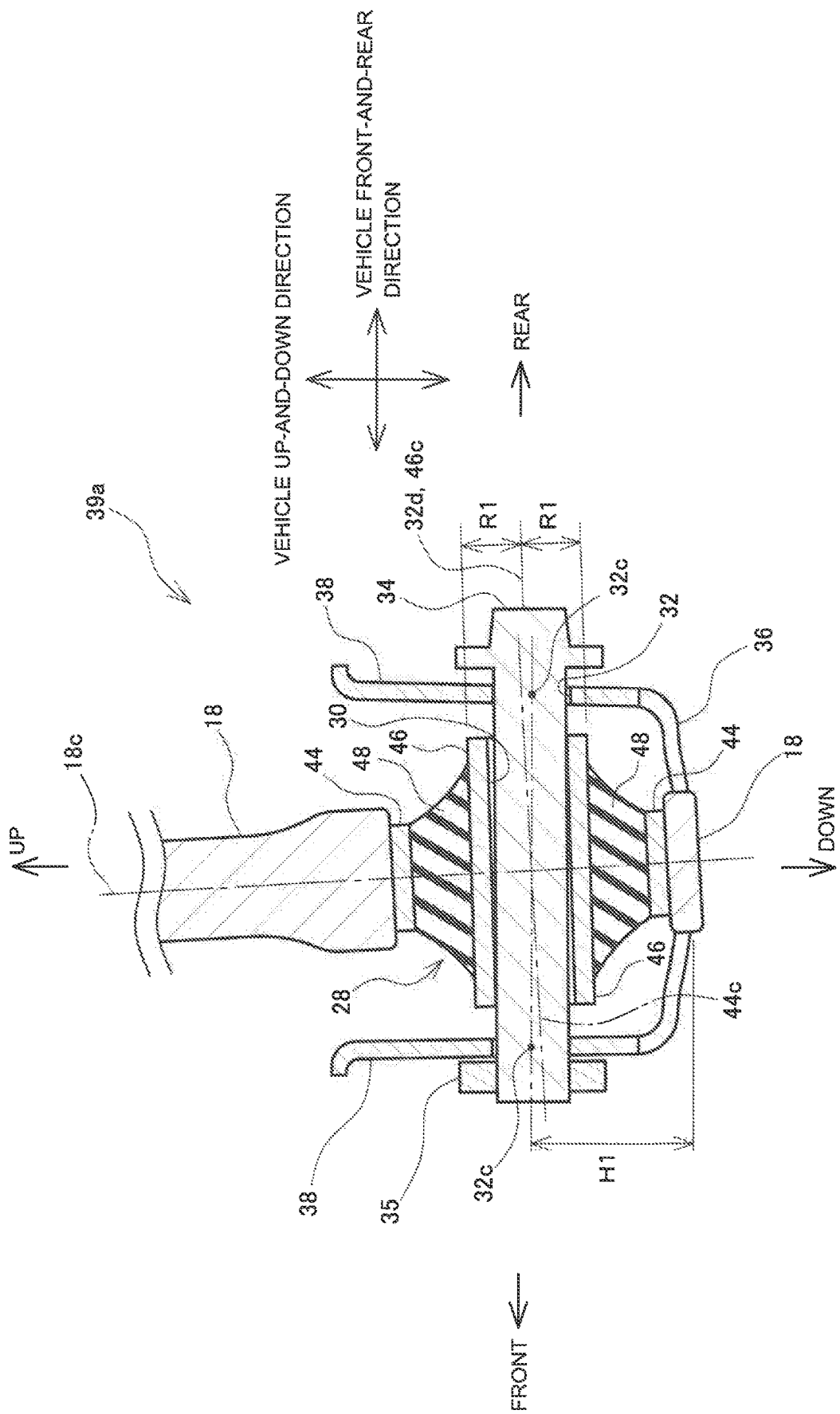
FIG. 3 is a cross-sectional view along A-A shown in FIG. 1.

The lower arm 20 is made of, for example, aluminum alloy and has, as shown in FIGS. 2A, 2B, and 3, a bottom surface 36 extending in the vehicle width direction and a pair of vertical walls 38 standing from the bottom surface 36 and separated from each other in the vehicle front-and-rear direction. The bottom surface 36 and the pair of vertical walls 38 also form a generally U-shaped cross section as shown in FIG. 3. Furthermore, as shown in FIGS. 2A and 2B, in the lower arm 20, the bottom surface 36 is notched at the outer end portions 39 in the vehicle width direction, and the pair of vertical walls 38 have tip portions 39a, each having a bolt hole 32. A dot-and-dash line 32d shown in FIG. 2A is a center line connecting centers 32c of the pair of bolt holes 32. Each of the pair of bolt holes 32 is formed such that the height from the bottom surface 36 of the lower arm 20 to the center 32c of the bolt hole 32 is provided opposite to the position of H1. In FIG. 2B, the center 32c of the bolt hole 32 is represented as an intersection between a vehicle up-and-down direction center line 90 of the bolt hole 32 and a vehicle width direction center line 92 of the bolt hole 32. Additionally, a dot-and-dash line 94 is a vehicle width direction center line of a lightening hole 42 (which is along the vehicle up-and-down direction).

As shown in FIG. 2A, the circular lightening hole 42 with a diameter d is formed as a fitting receiving portion in the bottom surface 36 of the lower arm 20. The center 42c of the lightening hole 42 is located at a position separated from the center 32c of the bolt hole 32 by the distance L1 in the longitudinal direction of the bottom surface 36. As shown in FIG. 2A, the center 42c of the lightening hole 42 is represented as an intersection between a vehicle front-and-rear direction center line 96 of the lower arm 20 and a vehicle width direction center line 98 of the lightening hole 42 (which is along the vehicle front-and-rear direction).

Carrier Bush

As shown in FIG. 3, a carrier bush 28 is configured to include a metallic outer cylinder 44, a metallic inner cylinder 46 which is inserted inside the outer cylinder 44 and has an outer surface with a radius R1, and a rubber hush 48 located between the outer cylinder 44 and the inner cylinder 46. The inner cylinder 46 forms a center hole 30 of the carrier bush 28 and has an axial length formed to be longer than those of the outer cylinder 44 and the rubber bush 48, resulting in exposure of axial end portions of the inner cylinder 46 from the rubber bush 48.

As shown in FIGS. 1 and 3, the carrier bush 28 is press-fitted into the carrier 18 at the lower end of the carrier 18, and the lower arm 20 and the carrier 18 are fastened by inserting the bolt 34 into the center hole 30 of the carrier bush 28 and the bolt holes 32 of the lower arm 20 and by screw fastening the bolt 34 with a nut 35.

Furthermore, because, in the suspension 14, the upper arm 22 is connected to the carrier 18 as described above, and the lower arm supports the coil spring 24, the force to shift the center hole 30 of the carrier bush 28 with respect to the bolt hole 32 of the lower arm 20 may be applied onto the portions where the carrier bush 28 and the upper arm 22 are attached. In this case, as shown in FIG. 3, an up-and-down direction center line 18c of the carrier 18 is inclined from the vertical direction, and an angle formed by the center line 18c and the center line 32d connecting the centers 32c of the pair of bolt holes 32 is inclined from a right angle. A center line 44c of the outer cylinder 44 is also shifted with respect to a center line 46c of the inner cylinder 46. This shift is absorbed when the rubber bush 48 of the carrier bush 28 bends. At this time, due to bending of the rubber bush 48, a corner portion of the inner cylinder 46 which is on the upper front side in the vehicle front-and-rear direction abuts on the bolt 34. A corner portion of the inner cylinder 46 which is on the lower rear side in the vehicle front-and-rear direction also abuts on the bolt 34. This causes the bolt 34 to be pressed against the bolt hole 32 of the lower arm 20. The lower arm 20 and the carrier 18 are thus fastened with the reaction force of the bent rubber bush 48 applied to the bolt 34, and therefore, attachment and removal of the bolt 34 are not easy.

Jig

Figure 4:
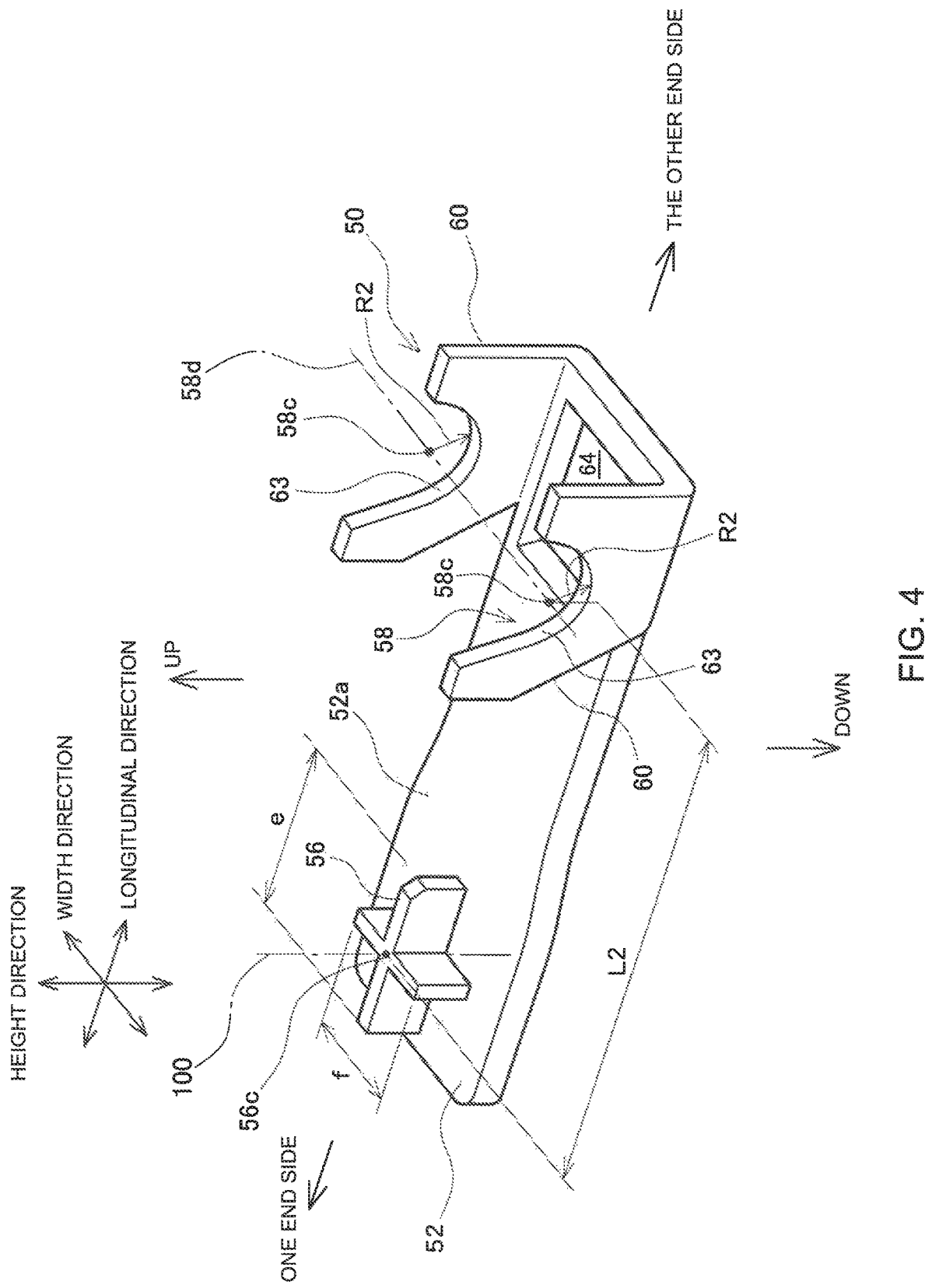
FIG. 4 is a perspective view showing a jig according to an embodiment.
Figure 5:
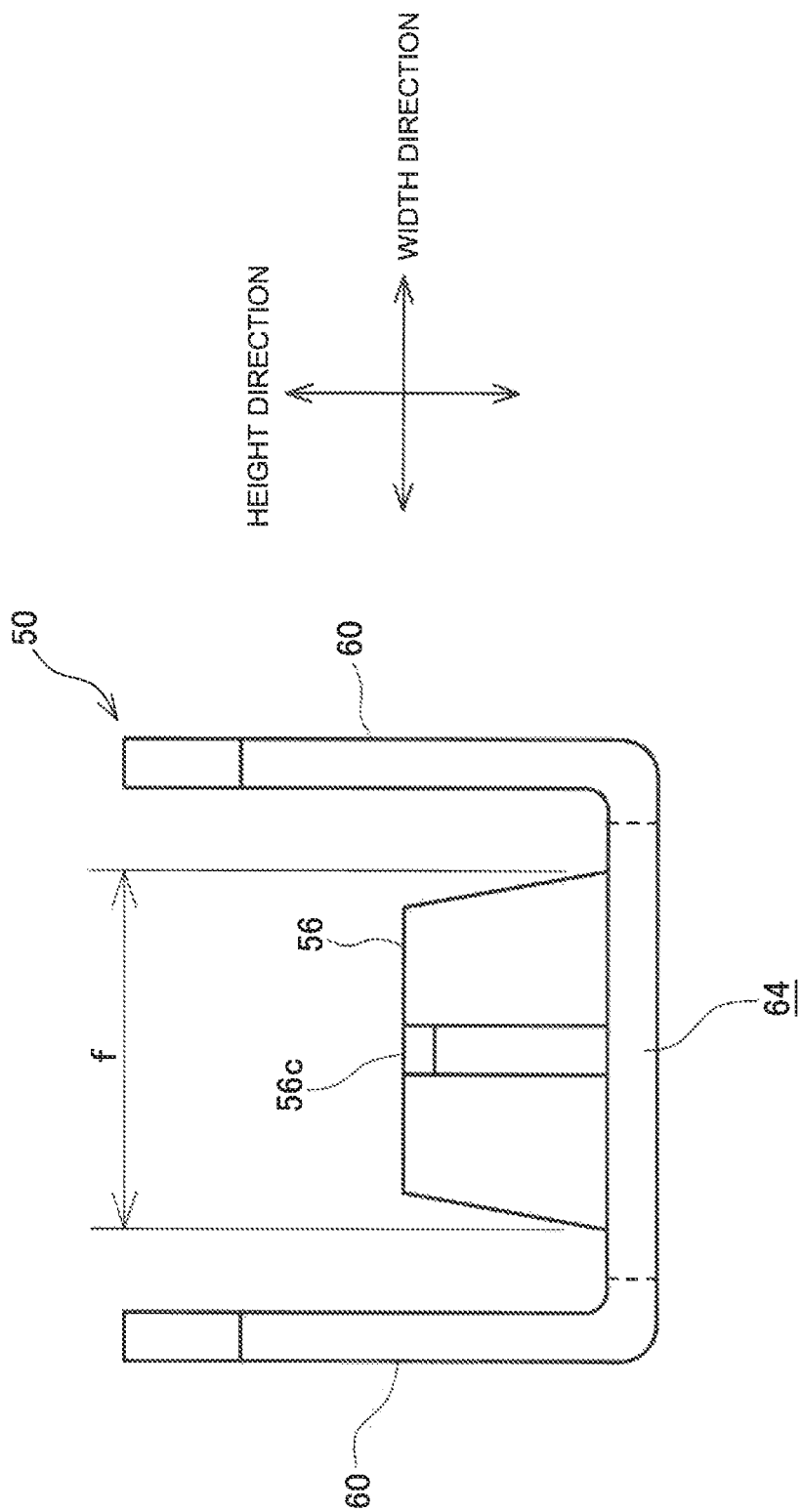
FIG. 5 is a front view of the jig according to the embodiment when viewed from the other end side in the longitudinal direction of a base.
Figure 6:
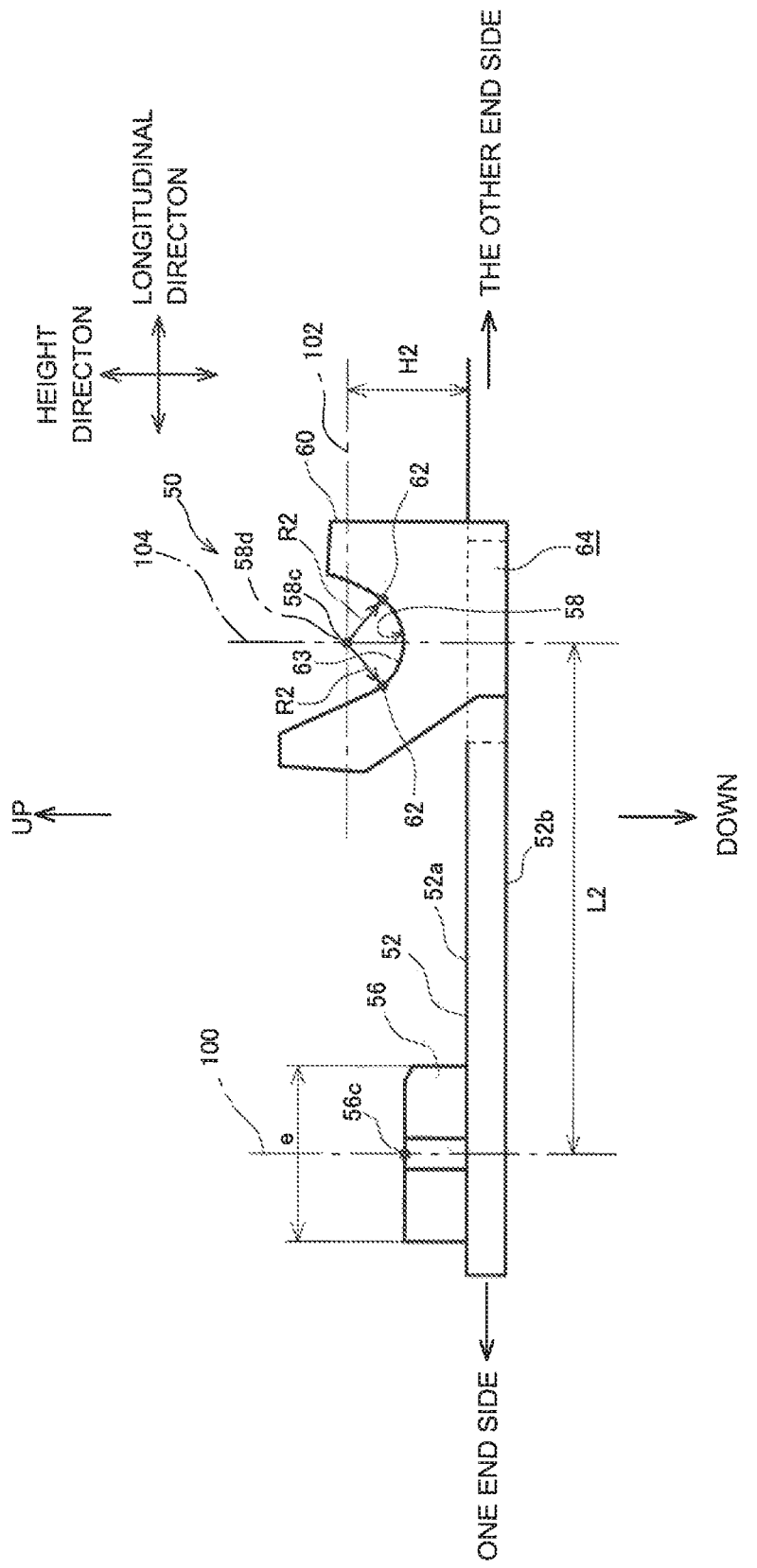
FIG. 6 is a side view of the jig according to the embodiment.

As shown in FIGS. 4 to 6, the jig 50 according to the present embodiment has a band plate-shaped base 52, a protrusion 56 provided, as a fitting portion, on one end side in the longitudinal direction of a surface 52a of the base 52, and a pair of plate-shaped inner cylinder guides 60 having support grooves 58 that stand on both side edges of the other end side in the longitudinal direction of the surface 52a of the base 52. The protrusion 56 is formed in a regular cruciform when viewed from above, and the external dimensions e, f of the protrusion 56 are formed to be approximately equal to or slightly smaller than the diameter d of the lightening hole 42 of the lower arm 20 described above. Furthermore, the jig 50 according to the present embodiment has a virtual center 58c at which, when the outer surface of the inner cylinder 46 of the aforementioned carrier bush 28 contacts the support groove 58, the distances from a plurality of contact points 62 thereof to the virtual center 58c are equal to the radius R1 of the outer surface of the inner cylinder 46. In FIG. 4, a dot-and-dash line 58d indicates a center line connecting the virtual centers 58c of the pair of support grooves 58. In FIG. 6, a dot-and-dash line 100 indicates a longitudinal center line of the protrusion 56 (which is along the height direction).

Figure 7:
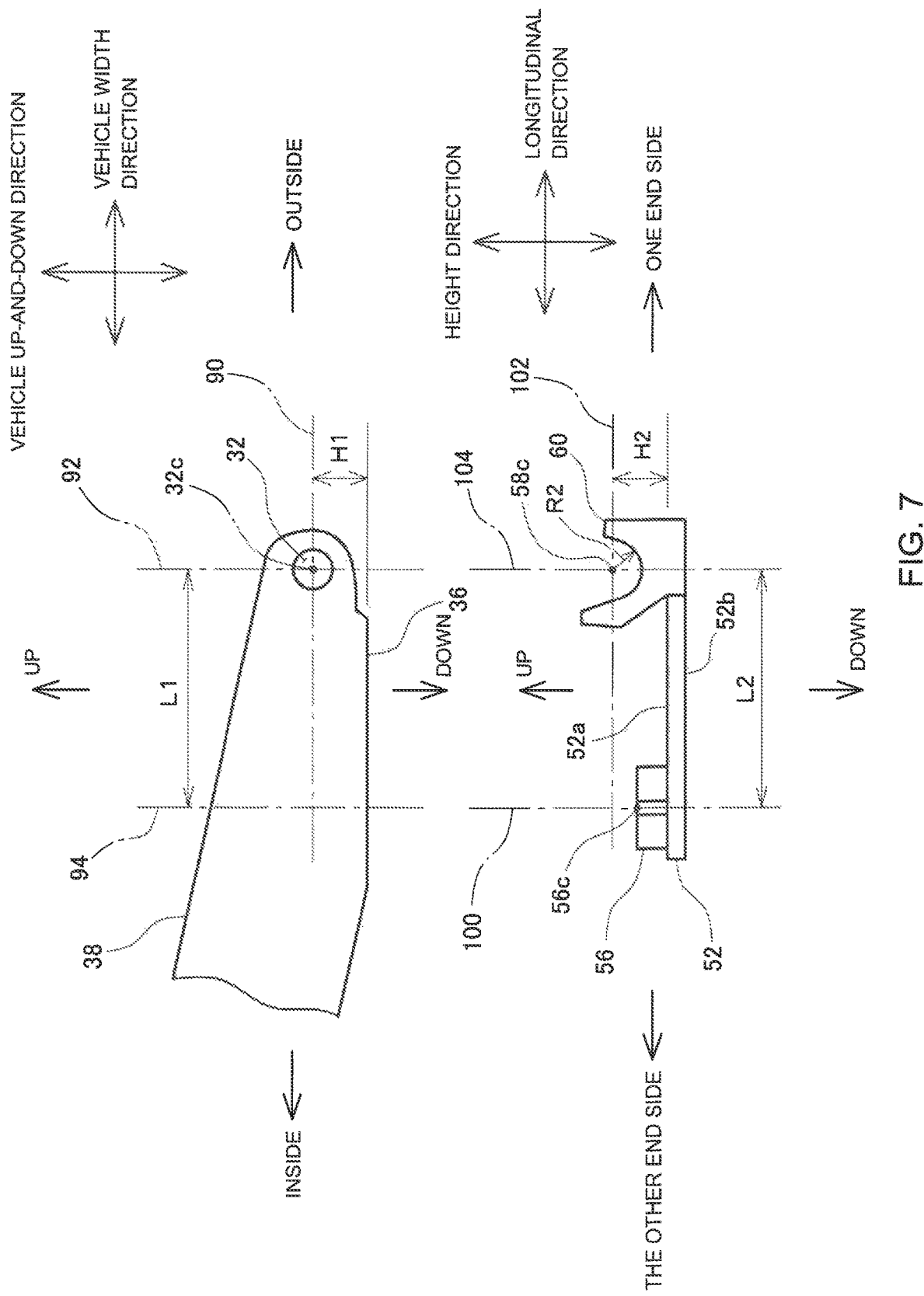
FIG. 7 is a schematic diagram of the jig and the lower arm before the jig is located under the lower arm, when viewed from the side.
Figure 8:
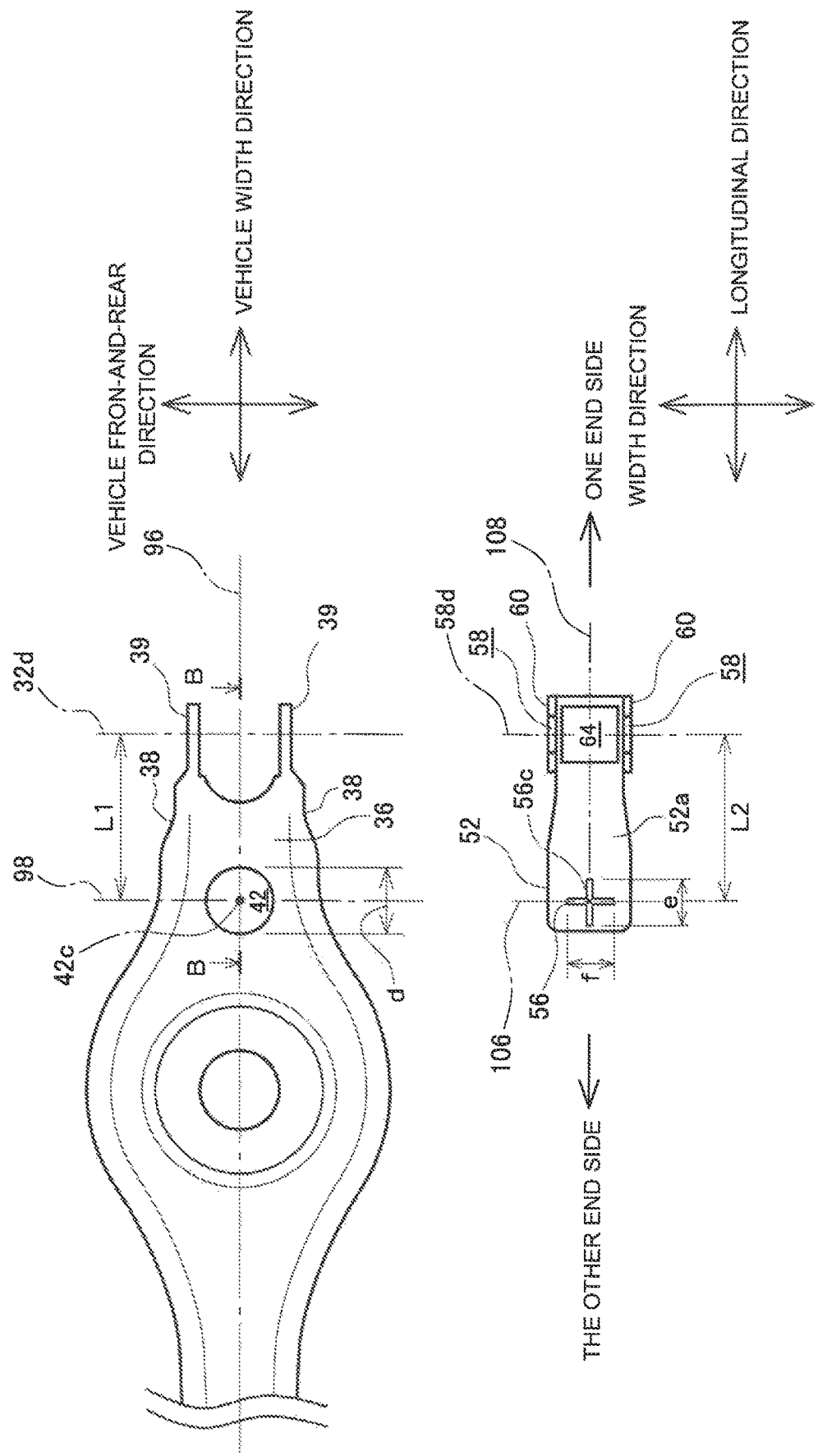
FIG. 8 is a plane view of the jig and the lower arm in the state shown in FIG. 7 when viewed from above.

As shown in FIGS. 7 and 8, in the jig 50, the height H2 from the surface 52a of the base 52 to the virtual center 58c is equal to the height H1 from the bottom surface 36 of the lower arm 20 to the center 32c of the bolt hole 32, and the longitudinal distance L2 of the base 52 from the center 56c of the protrusion 56 to the virtual center 58c in the longitudinal direction of the base 52 is equal to the longitudinal distance L1 of the lower arm 20 from the center 42c of the lightening hole 42 of the lower arm 20 to the center 32c of the bolt hole 32. In FIG. 8, a dot-and-dash line 106 indicates a width direction center line of the protrusion 56, and a dot-and-dash line 108 indicates a longitudinal direction center line of the protrusion 56.

Additionally, as shown in FIG. 6, in the jig 50 according to the present embodiment, the support groove 58 is formed in a U-shape having an arc-shaped bottom portion 63 and has the virtual center 58c at which, when the outer surface of the inner cylinder 46 of the aforementioned carrier bush 28 contacts the support groove 58, the distances from the plurality of contact points 62 thereof to the virtual center 58c are equal to the radius R1 of the outer surface of the inner cylinder 46. Because, in the present embodiment, the virtual center 58c is assumed to be an arc center 63c of the arc-shaped bottom portion 63, the radius R2 of the arc of the bottom portion 63 is equal to the radius R1 of the outer surface of the inner cylinder 46 of the carrier bush 28. Therefore, when the outer surface of the inner cylinder 46 of the carrier bush 28 contacts the bottom portion 63 of the support groove 58 at the plurality of contact points 62, the center line 46c of the inner cylinder 46 and the arc center 63c of the bottom portion 63 are both located in the virtual center 58c. In FIG. 6, the virtual center 58c is represented as an intersection between a longitudinal center line 104 passing through the arc center of the bottom portion 63 and a height direction center line 102. In addition, the width of the U-shaped support groove 58 is increased from the bottom portion 63 toward the opening side. Furthermore, as shown in FIG. 4, an escape hole 64, which is rectangular when viewed from above, is formed in the base 52 between the pair of support grooves 58, in order to avoid interference with the carrier 18 during operation.

Actions and Effects of Present Embodiment

The actions and effects of the jig 50 of the present embodiment and a method of attaching and removing the bolt 34 using the jig 50 will be described below. First, the assisting action by the jig 50 according to the present embodiment in the operation of inserting the bolt 34 into the center hole 30 of the carrier bush 28 and the bolt hole 32 of the lower arm 20 will be described.

Figure 9:
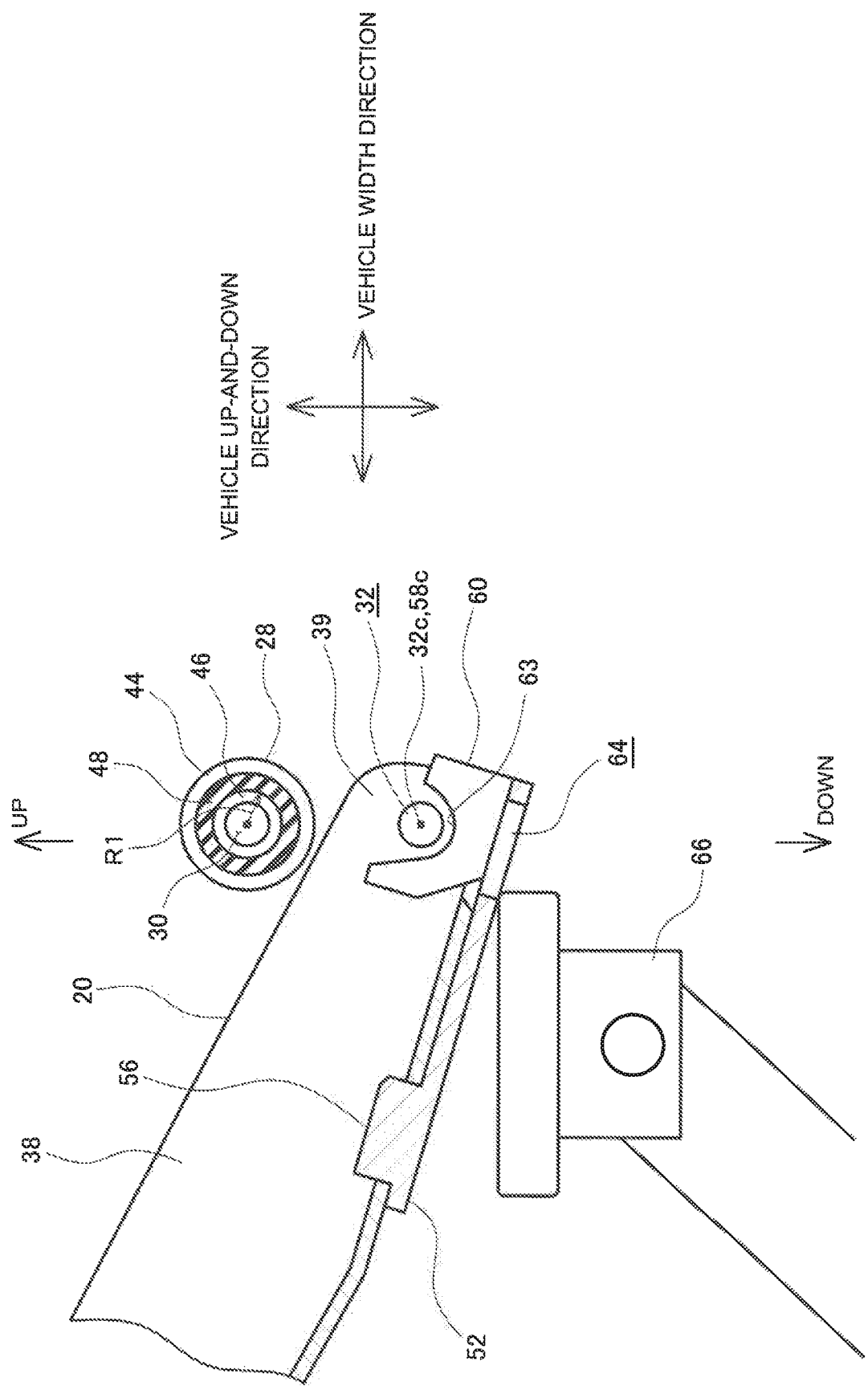
FIG. 9 is an explanatory diagram showing the start of the operation of fastening the lower arm and the carrier using the jig according to the embodiment.

First, the jig 50 is prepared. The protrusion 56 of the jig 50 is then inserted into the lightening hole 42 of the bottom surface 36 of the lower arm 20, and as shown in FIG. 9, the surface 52a of the base 52 of the jig 50 is brought in contact with the bottom surface 36 of the lower arm 20 (the step of attaching the jig). Thus, the base 52 is held in contact with the bottom surface 36 of the lower arm 20 and is positioned with respect to the lower arm 20. In FIG. 9, for the purpose of promoting an understanding of the embodiment, a cross section of the lower arm 20 corresponding to line B-B in FIG. 8 is illustrated, and only the carrier bush 28 is illustrated without illustrating the carrier 18. As described above, in the jig 50, the height H2 from the surface 52a of the base 52 to the virtual center 58c is equal to the height H1 from the bottom surface 36 to the center 32c of the bolt hole 32 of the lower arm 20, and the longitudinal distance L2 of the base 52 from the center 56c of the protrusion 56 to the virtual center 58c in the longitudinal direction of the base 52 is equal to the longitudinal distance L1 of the lower arm 20 from the center 42c of the lightening hole 42 to the center 32c of the bolt hole 32 of the lower arm 20. Therefore, when the protrusion 56 of the jig 50 is inserted into the lightening hole 42 of the bottom surface 36 of the lower arm 20 as shown in FIG. 9, the position of the virtual center 58c of the pair of support grooves 58 and the position of the center 32c of the bolt hole 32 of the lower arm 20 coincide with each other. In this state, a back side 52b of the base 52 of the jig 50 is jacked up from below together with the lower arm 20 with a jack 66 (the step of pushing up). Here, the pair of the inner cylinder guides 60 provided on the base 52 of the jig 50 can penetrate into a tip inner portion of the lower arm 20 which is the space between the outer end portions 39, and move to a position at which the inner cylinder 46 of the carrier bush 28 is rotatably supported inside the lower arm 20.

Figure 10:
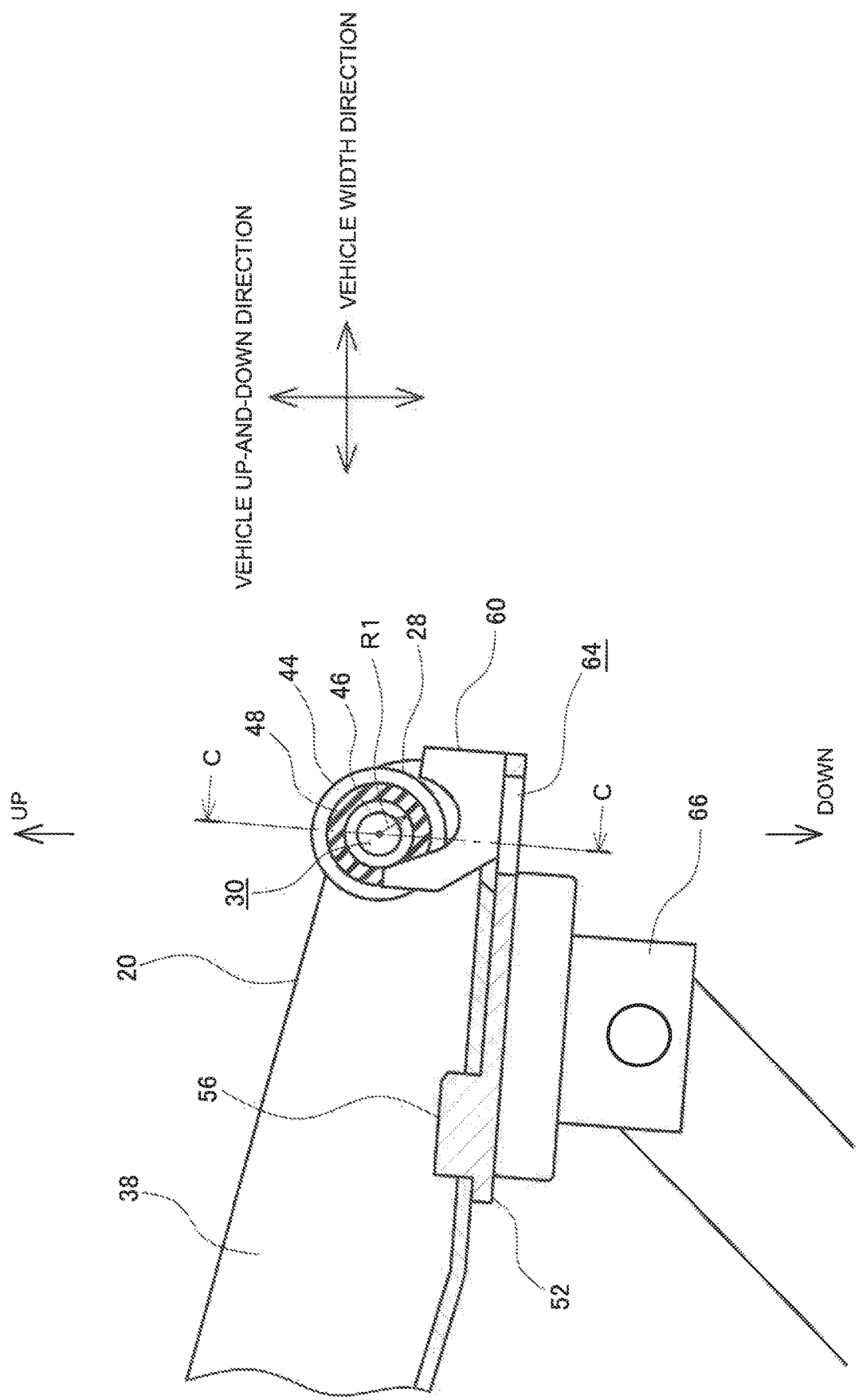
FIG. 10 is an explanatory diagram showing an inner cylinder of a carrier bush contacting a tip portion of a support groove after the fastening operation of FIG. 8 has progressed.

When the back side 52b is jacked up from the state described above, as shown in FIG. 10, a tip of the support groove 58 of the inner cylinder guide 60 contacts the outer surface of the axial end portion of the inner cylinder 46 of the carrier bush 28. As described above, the width of the U-shaped support groove 58 is increased from the bottom portion 63 toward the opening side. Therefore, when the back side 52b is jacked up as shown in FIG. 10, the tip of the support groove 58 guides the inner cylinder 46 of the carrier bush 28 to the bottom portion 63 of the support groove 58.

Figure 11:
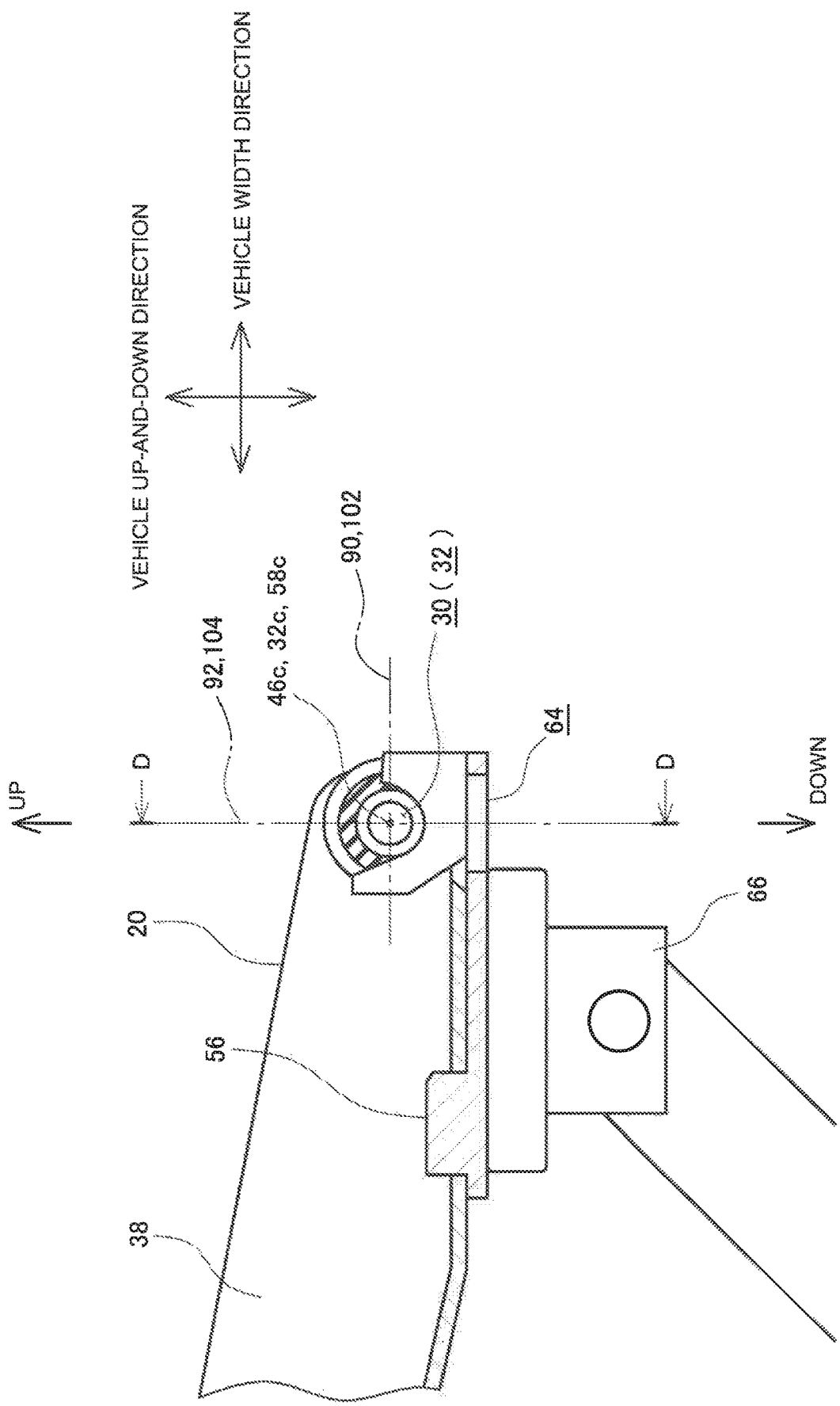
FIG. 11 is an explanatory diagram showing coincidence of positions of a virtual center of the support groove, a center hole of a carrier bush, and a bolt hole of the lower arm after the fastening operation has progressed from the state in FIG. 9.

At this time, the up-and-down direction center line 18c of the carrier 18 is inclined from the vertical direction, and the direction of the center line 44c of the outer cylinder 44 and the direction of the center line 46c of the inner cylinder 46 are both inclined with respect to the center line 32d connecting the pair of bolt holes 32. Therefore, if jack-up is continued, as shown in FIGS. 11 and 12, first, the outer surface of the inner cylinder 46 on the front side in the vehicle front-and-rear direction contacts the bottom portion 63 of the support groove 58 of the inner cylinder guide 60.

Figure 12:
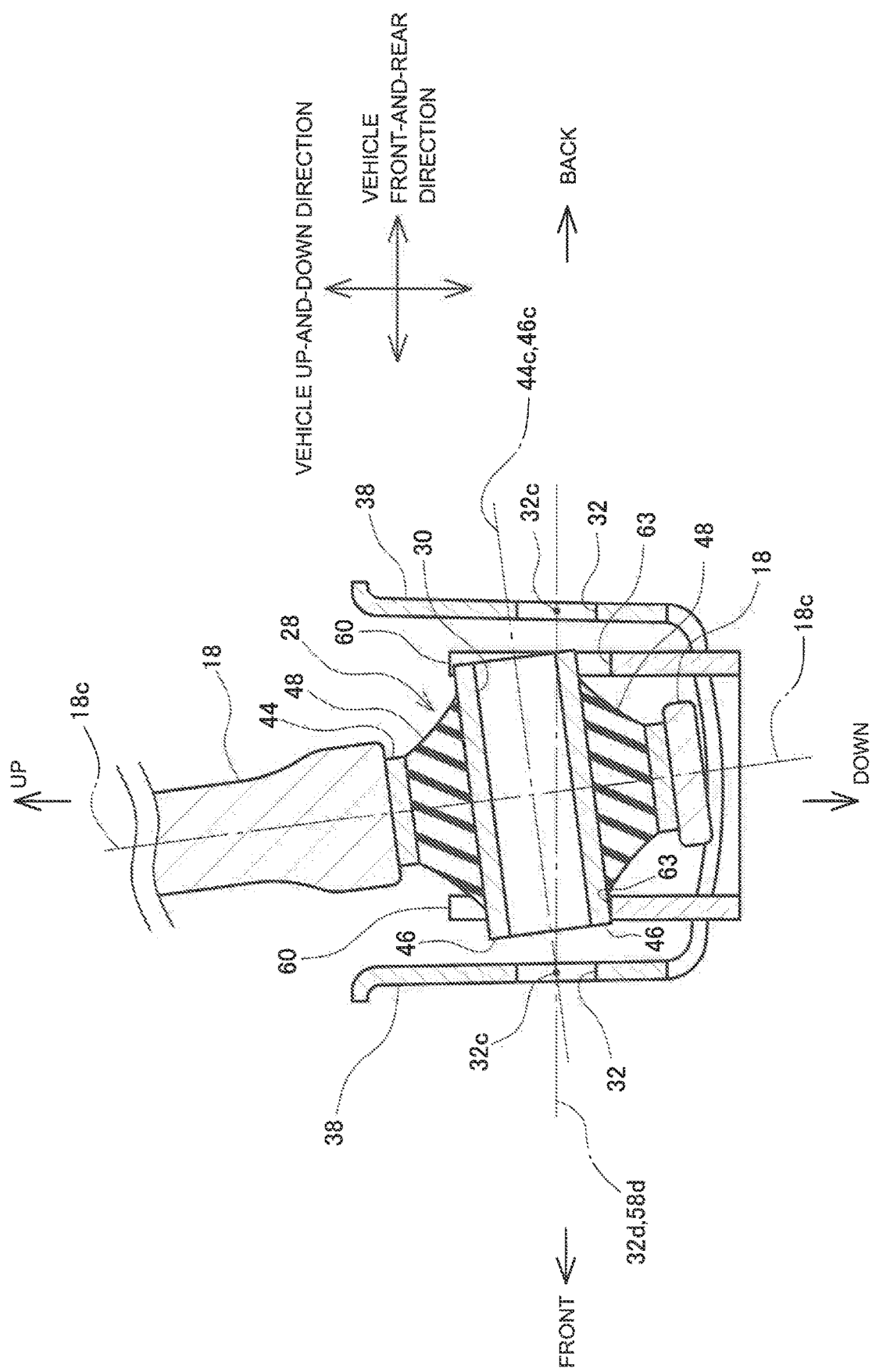
FIG. 12 is a cross-sectional view along C-C shown in FIG. 10.

If the back side 52b is further jacked up, as shown in FIG. 12, the outer surface of the inner cylinder 46 on the front side in the vehicle front-and-rear direction, which is in contact with the support groove 58 of the inner cylinder guide 60, is lifted up by the inner cylinder guide 60 to bend the rubber bush 48 on the front side in the vehicle front-and-rear direction. Then, the outer surface of the inner cylinder 46 on the rear side in the vehicle front-and-rear direction moves toward the bottom portion 63 of the support groove 58, and the direction of the center line 44c of the outer cylinder 44 becomes shifted from the direction of the center line 46c of the inner cylinder 46. Then, when the outer surface of the inner cylinder 46 on the front side in the vehicle front-and-rear direction and the outer surface of the inner cylinder 46 on the rear side of the vehicle front-and-rear direction (both ends in the axial direction) respectively contact the pair of support grooves 58 at the plurality of contact points 62, as shown in FIG. 13, the outer surface of the inner cylinder 46 of the carrier bush 28 is held in the support grooves 58 of the inner cylinder guides 60 (the step of holding).

Figure 13:
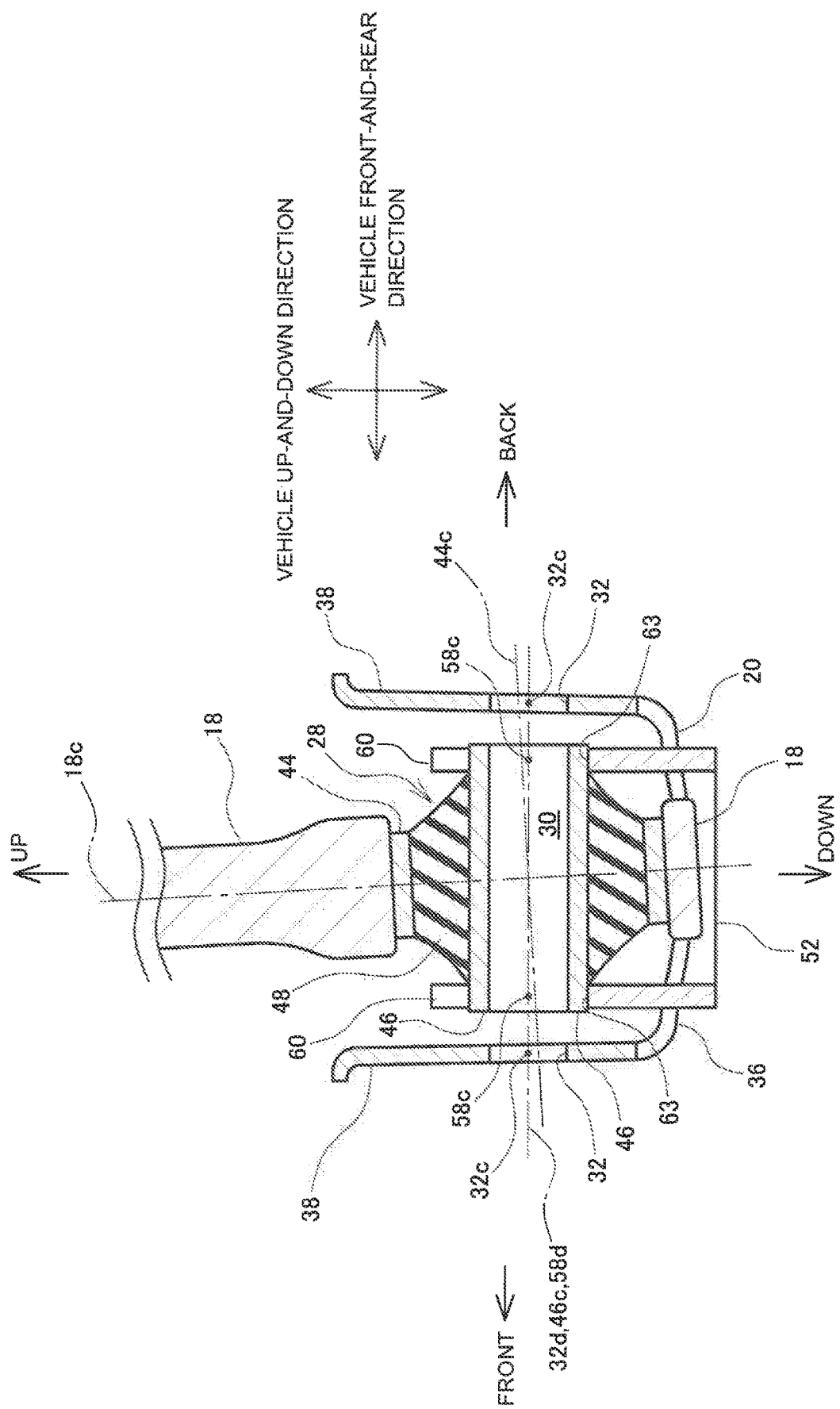
FIG. 13 is a cross-sectional view along D-D shown in FIG. 11.

In the above state, as shown in FIG. 13, the center line 46c of the inner cylinder 46 and the center line 32d connecting the centers 32c of the pair of bolt holes 32 become aligned in the same horizontal direction, and the center line 46c of the inner cylinder 46 of the carrier bush 28 becomes parallel to the bottom surface 36 of the lower arm 20. In this state, the position and the direction of the virtual center line 58d connecting the virtual centers 58c of the pair of support grooves 58 coincide with the position and the direction of the center line 46c of the inner cylinder 46 of the carrier bush 28. Furthermore, as described above, the position and direction of the virtual center line 58d connecting the virtual centers 58c of the pair of support grooves 58 of the jig 50 coincide with the position and the direction of the center line 32d connecting the centers 32c of the pair of bolt holes 32 of the lower arm 20. Therefore, in the state shown in FIG. 13, the position and the direction of the center line 46c of the inner cylinder 46 of the carrier bush 28 coincide with the position and the direction of the center line 32d connecting the centers 32c of the pair of bolt holes 32 of the lower arm 20. Subsequently, the bolt 34 is inserted (the step of attaching and removing the bolt).

The above-described assisting action by the jig 50 enables easy insertion of the bolt 34 into the center hole 30 of the carrier bush 28 and the bolt holes 32 of the lower arm 20.

In addition, in the jig 50 according to the present embodiment, it is assumed that the support groove 58 is the U-shaped groove having the arc-shaped bottom portion 63, and that the virtual center 58c is the arc center. Therefore, when the outer surface of the inner cylinder 46 of the carrier bush 28 contacts the bottom portion 63 of the support groove 58 at the plurality of contact points 62, both of the center line 46c of the inner cylinder 46 and the arc center 63c of the bottom portion 63 become located in the virtual center 58c, and the radius R2 of the arc of the bottom portion 63 of the support groove 58 and the radius R1 of the outer surface of the inner cylinder 46 of the carrier bush 28 can coincide with each other to hold the inner cylinder 46. Therefore, the inner cylinder 46 can be stably supported on the support groove 58.

Furthermore, in the jig 50 according to the present embodiment, the width of the U-shaped support groove 58 is increased from the bottom portion 63 toward the opening side. Therefore, when the base 52 of the jig 50 is pushed up from below, it is possible to guide the inner cylinder 46 of the carrier bush 28 to the bottom portion 63 of the support groove 58, thereby easily guiding the inner cylinder 46 of the carrier bush 28 such that the position and the direction of the center line 46c of the inner cylinder 46 of the carrier bush 28 coincide with the position and the direction of the virtual center line 58d connecting the virtual centers 58c of the pair of the support grooves 58 of the jig 50.

Figure 14:
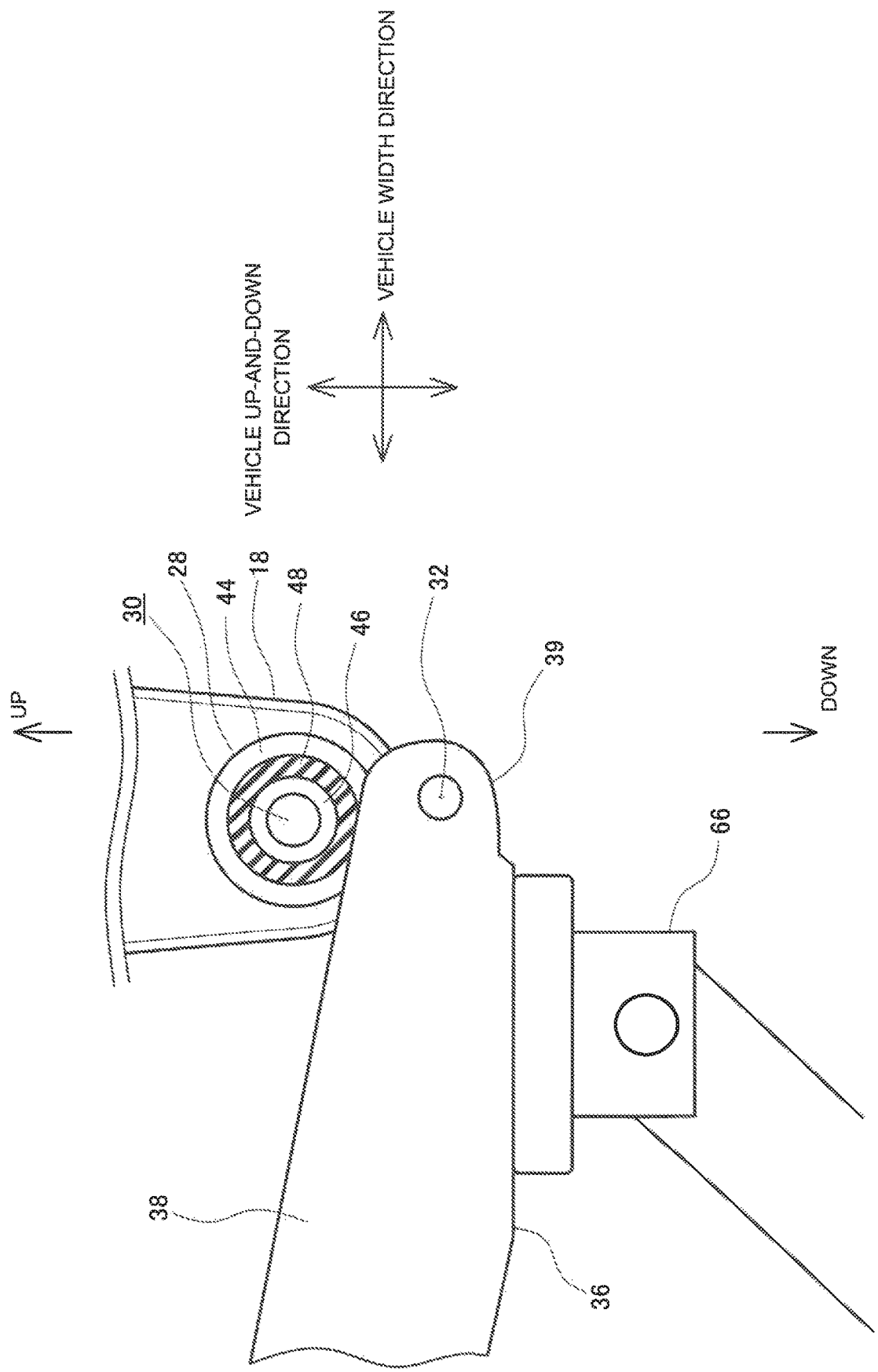
FIG. 14 is an explanatory diagram showing the start of the operation of fastening the lower arm and the carrier without using the jig according to the embodiment.
Figure 15:
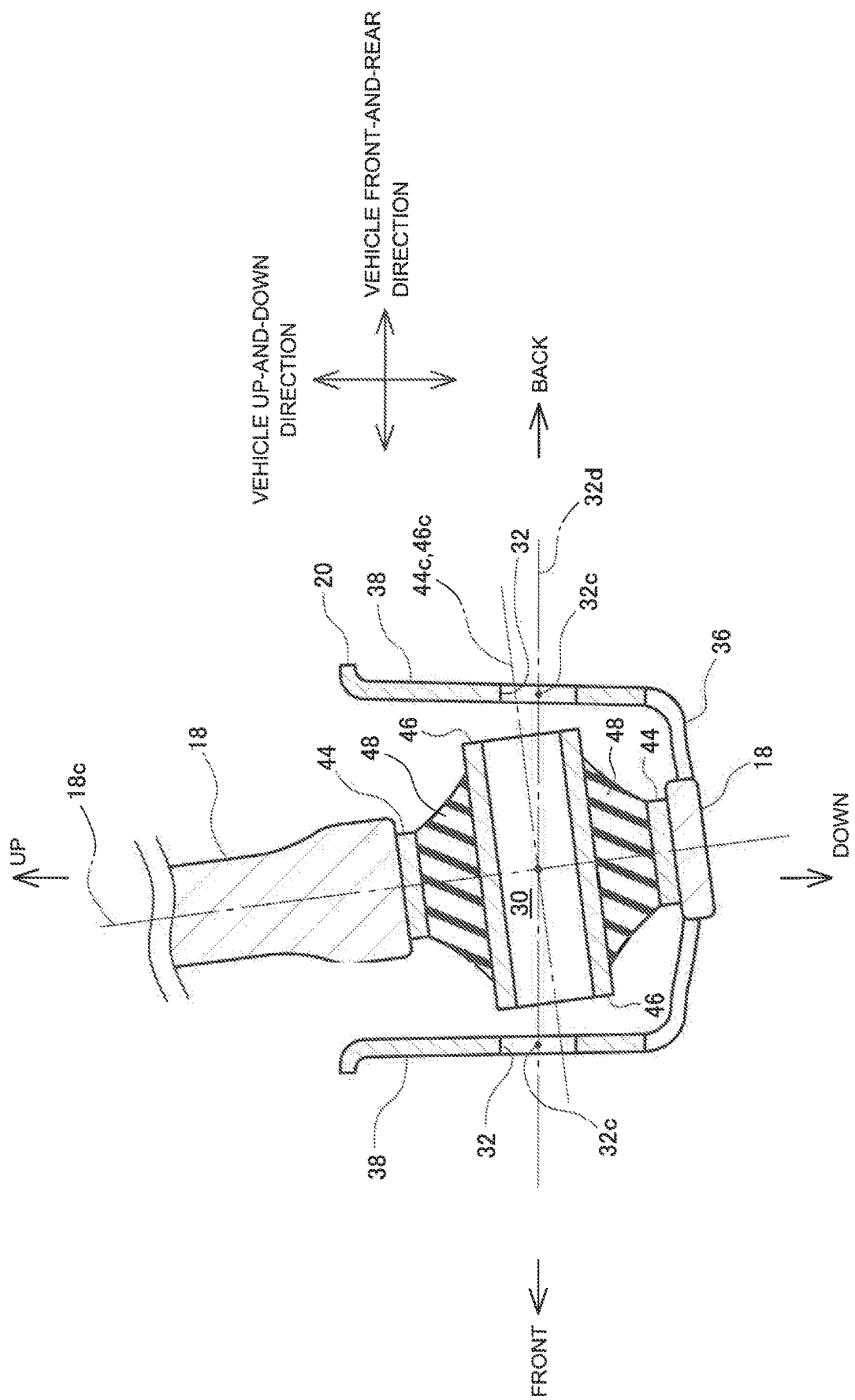
FIG. 15 is a cross-sectional view showing overlap of the center hole of the carrier bush with the bolt hole of the lower arm after the fastening operation has progressed from the state in FIG. 14.

On the other hand, as shown in FIG. 14, when the lower arm 20 is jacked up without using the jig 50 according to the embodiment, the direction of both the center line 44c of the outer cylinder 44 and the center line 46c of the inner cylinder 46 of the carrier bush 28 is shifted with respect to the center line 32d connecting the centers 32c of the pair of bolt holes 32, as shown in FIG. 15. In this case, the workability is poor because there is a need for, for example, the additional operation of inserting a rod-like tool, such as a screwdriver, into the center hole 30 of the carrier bush 28 from the bolt hole 32 to bend the rubber bush 48 of the carrier bush 28 to thereby cause the position and the direction of the center line 46c of the inner cylinder 46 of the carrier bush 28 to coincide with the position and the direction of the center line 32d connecting the centers 32c of the pair of bolt holes 32 of the lower arm 20. With the jig 50 according to the present embodiment, it is possible to cause the position and the direction of the center line 46c of the inner cylinder 46 of the carrier bush 28 to easily coincide with the position and the direction of the center line 32d connecting the centers 32c of the pair of bolt holes 32 of the lower arm 20, and therefore, the above operation is unnecessary.

Next, the assisting action by the jig 50 according to the present embodiment in the operation of extracting the bolt 34 from the center hole 30 of the carrier bush 28 and the bolt holes 32 of the lower arm 20 will be described. The above description in relation to the operation of inserting the bolt 34 will also be mentioned briefly.

As described above, when the lower arm 20 and the carrier 18 are fastened, the rubber bush 48 of the carrier bush 28 bends, and the reaction three from the bent rubber bush 48 is applied to the bolt 34.

Figure 16:
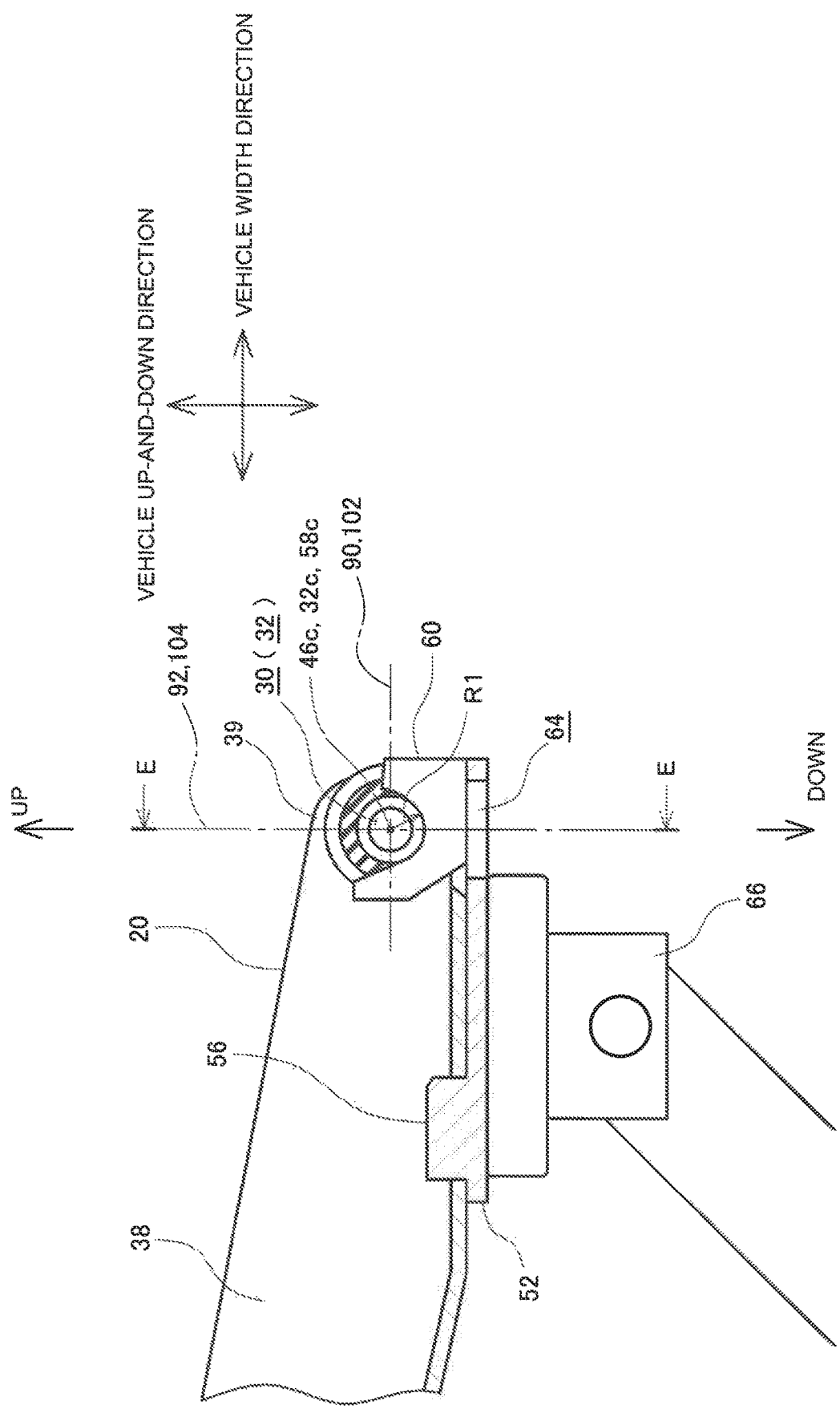
FIG. 16 is an explanatory diagram showing the start of the operation of releasing fastening of the lower arm and the carrier using the jig according to the embodiment.
Figure 17:
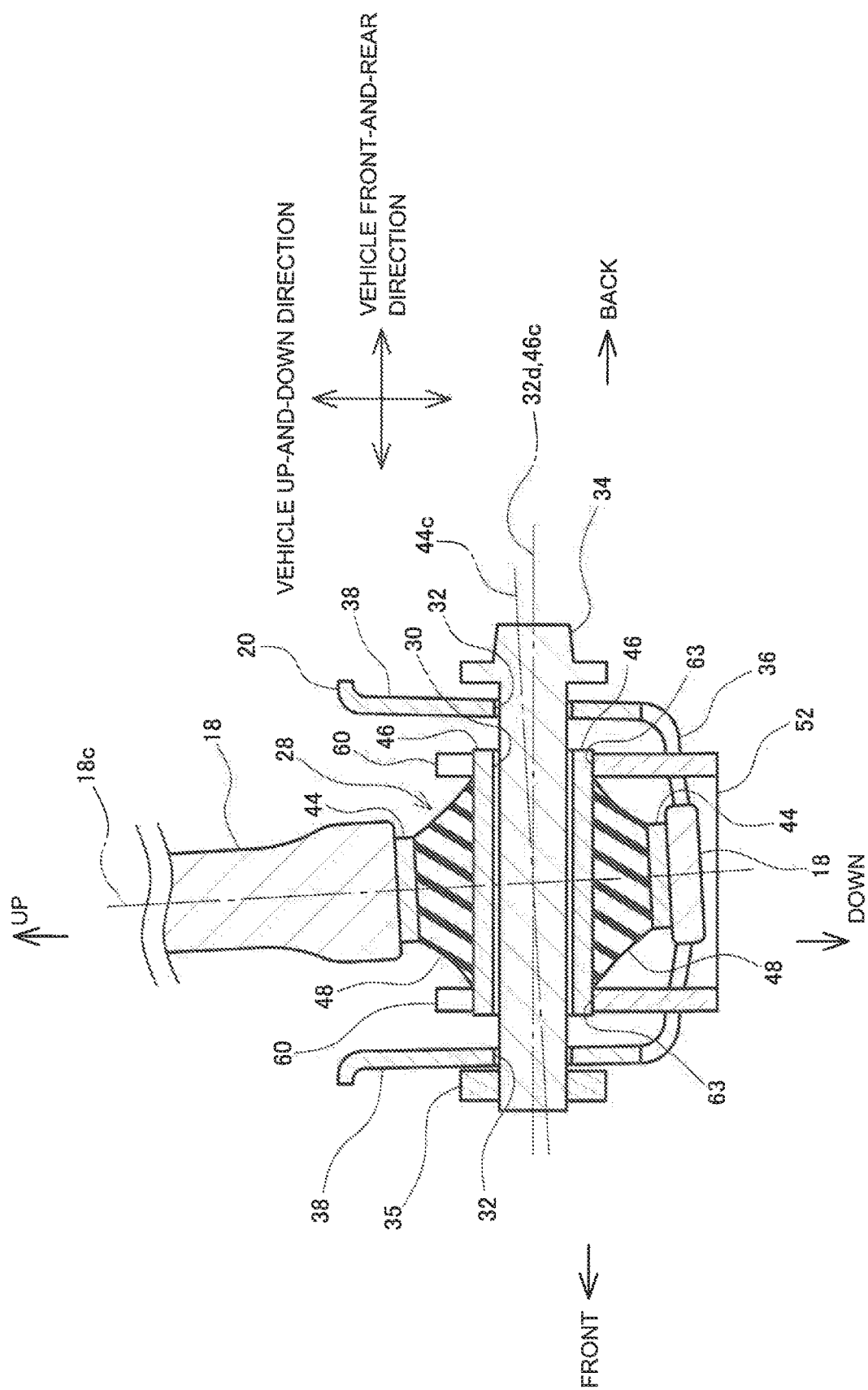
FIG. 17 is a cross-sectional view along E-E shown in FIG. 16.

First, the jig 50 is prepared. As shown in FIG. 16, the protrusion 56 of the jig 50 is inserted into the lightening hole 42 in the bottom surface 36 of the lower arm, and the base 52 of the jig 50 is brought into contact with the bottom surface 36 of the lower arm 20 (the step of attaching the jig). The base 52 of the jig 50 in this state is jacked up from below (the step of pushing up). Then, as shown in FIG. 17, the outer surface of the inner cylinder 46 on both sides in the vehicle front-and-rear direction respectively contact the pair of support grooves 58 at the plurality of contact points 62, and the support grooves 58 of the inner cylinder guides 60 push up the outer surface of the inner cylinder 46 from both sides in the vehicle front-and-rear direction and hold it (the step of holding). It is thus possible to receive the lateral force, which has been applied from the carrier bush 28 to the bolt 34 as shown in FIG. 3, by the inner cylinder guide 60, and reduce lateral force applied to the bolt 34. In this state, as shown in FIG. 17, there are slight gaps between the bolt 34 and the inner surface of the inner cylinder 46, and between the bolt 34 and the inner surface of the hole 32 of the lower arm 20. Subsequently, the bolt 34 is extracted from the center hole 30 of the carrier bush 28 and the bolt holes 32 of the lower arm 20 (the step of attaching and removing the bolt). As such, the bolt 34 can be extracted easily.

As described above, by using the jig 50 according to the present embodiment, it is possible to easily insert and extract; that is, attach and remove, the bolt 34 for fastening the carrier 18 and the lower arm 20.

In addition, in the jig 50 according to the present embodiment, the fitting receiving portion of the lower arm 20 is the lightening hole 42 provided in the bottom surface 36 of the lower arm 20, and the fitting portion is the protrusion 56 provided on the surface of the base 52, and this simple structure enables restriction of the relative movement of the jig 50 with respect to the lower arm 20 and improved workability of the operation of attaching and removing the bolt 34 for fastening the carrier 18 and the lower arm 20.

Figure 18:
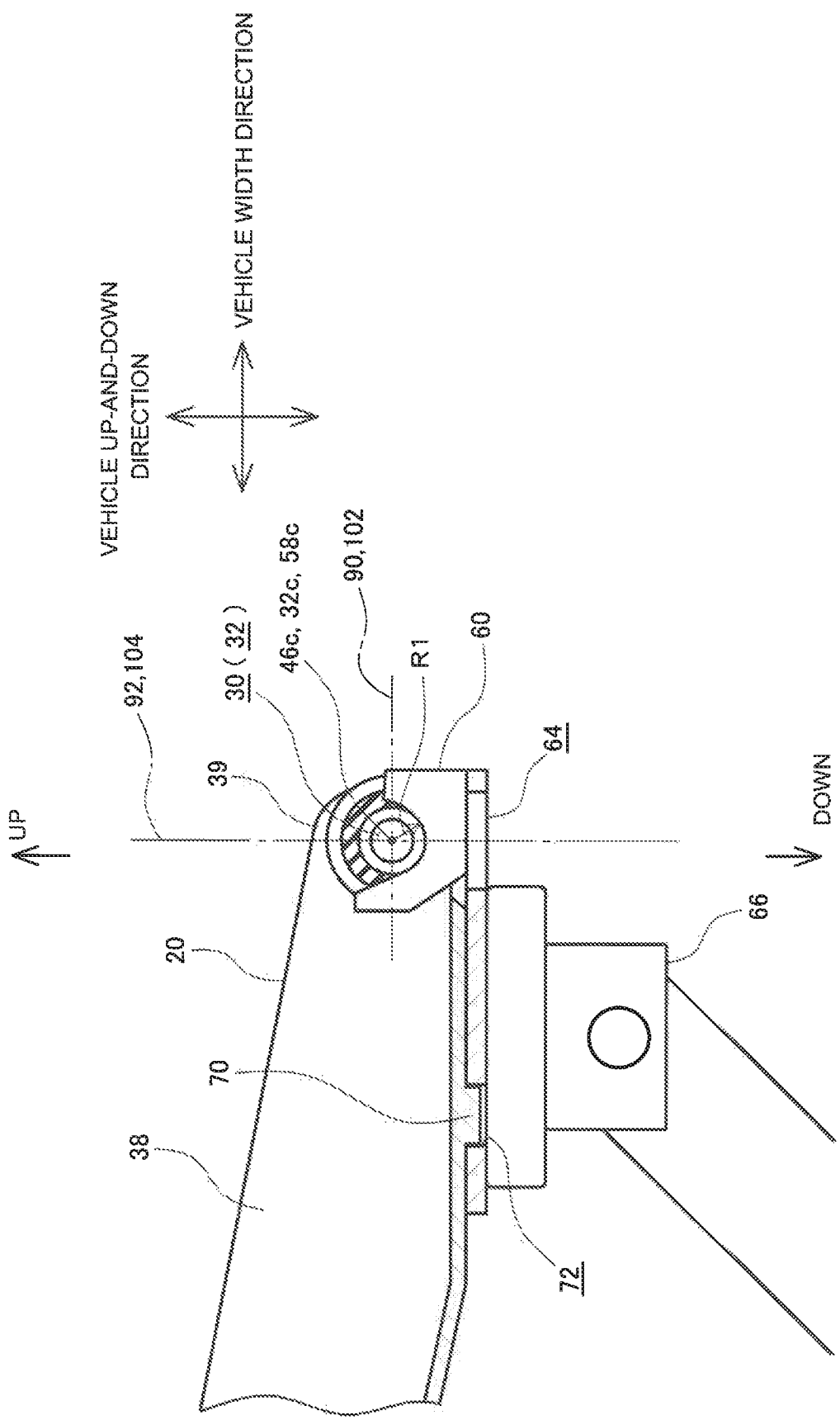
FIG. 18 is an explanatory diagram showing that a jig according to another embodiment having a fitting portion which is a hole provided in a surface of the base, is combined with a protrusion provided on the bottom surface of the lower arm.

Furthermore, as shown in FIG. 18, the fitting receiving portion may also be a protrusion 70 provided on the bottom surface 36 of the lower arm 20, and the fitting portion may be a hole 72 provided in the surface 52a of the base 52. Also in this case, the simple structure enables restriction of the relative movement of the jig 50 with respect to the lower arm 20 and improved workability of the operation of attaching and removing the bolt 34 for fastening the carrier 18 and the lower arm 20.

Other Embodiments

Other embodiments will be described below. In the description below, the portions that are the same as those included in the jig 50 described with reference to FIGS. 3 to 6 are assigned the same reference numerals as in FIGS. 3 to 6 (but in the 100s), and their description will be omitted.

Figure 19:
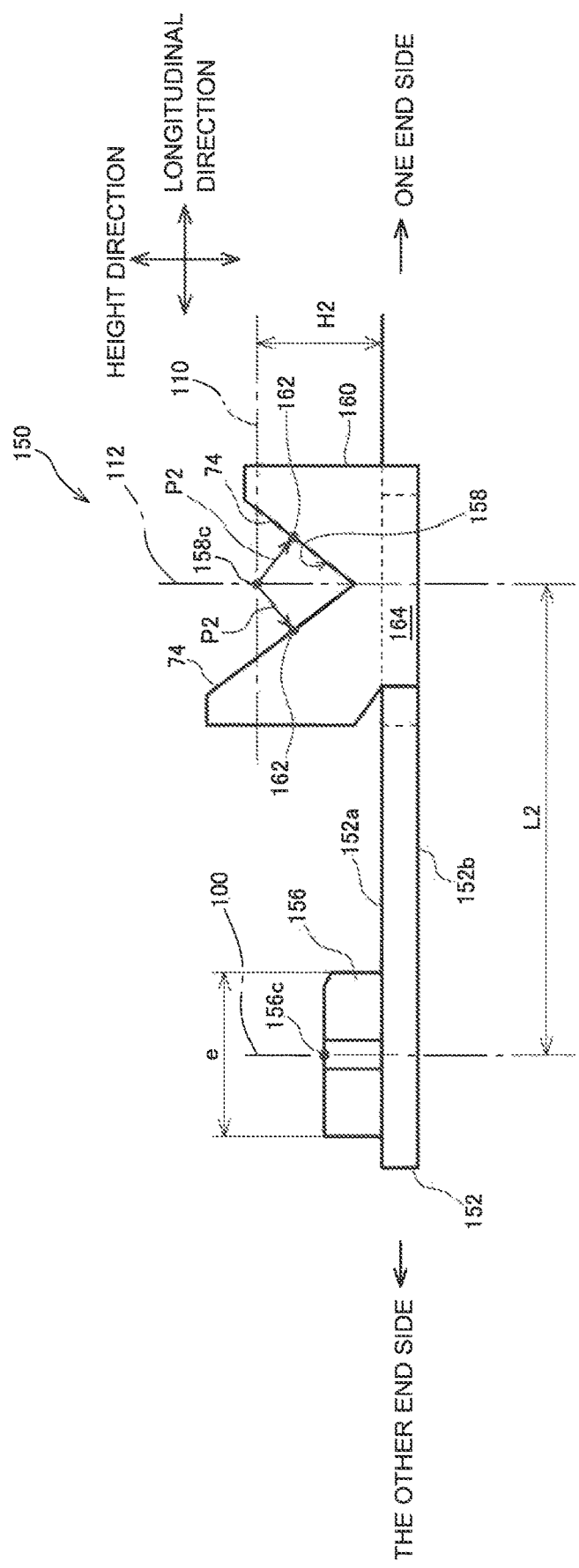
FIG. 19 is a side view showing a jig according to another embodiment where the support groove is a V-shaped groove.

As shown in FIG. 19, a jig 150 according to the present embodiment is obtained by making the U-shaped support groove 58 described with reference to FIGS. 3 to 6 into a V-shaped support groove 158. A virtual center 158c may be a point at which the distances P2 from V-shaped, two support surfaces 74 to the point are equal to the radius R1 of the outer surface of the inner cylinder 46 of the carrier bush 28. In FIG. 19, a dot-and-dash line 110 indicates a height direction center line of the support groove 158 passing through the virtual center 158c, and a dot-and-dash line 112 indicates a longitudinal center line of the support groove 158 passing through the virtual center 158c.

In the present embodiment, when a base 152 of the jig 150 in contact with the bottom surface 36 of the lower arm 20 is pushed up from below, due to the V shape of the support groove 158, it is possible to guide the inner cylinder 46 of the carrier bush 28 to the bottom portion 163 of the V-shaped support groove 158, thereby easily guiding the carrier bush 28 such that the position of the center hole 30 of the carrier bush 28 coincides with the position of the virtual center 158c of the jig 150. In addition, because the two support surfaces 74 of the support groove 158 contact the outer surface of the inner cylinder 46 at two supporting points, the position of the center hole 30 of the carrier bush 28 can be held to coincide with the position of the virtual center 158c of the jig 150. It is therefore possible to easily insert the bolt 34 into the center hole 30 of the carrier bush 28 and the bolt holes 32 of the lower arm 20.

Also in the present embodiment, when the base 152 of the jig 150 in contact with the bottom surface 36 of the lower arm 20 is jacked up from below, the outer surface of the inner cylinder 46 on both axial end sides respectively contacts the pair of V-shaped support grooves 158 at the contact points 162 on the two support surfaces 74, and the outer surface of the inner cylinder 46 of the carrier bush 28 can thus be supported from both axial end sides. It is therefore possible to reduce the lateral force applied from the carrier bush 28 to the bolt 34 and extract the bolt 34 easily.

Figure 20:
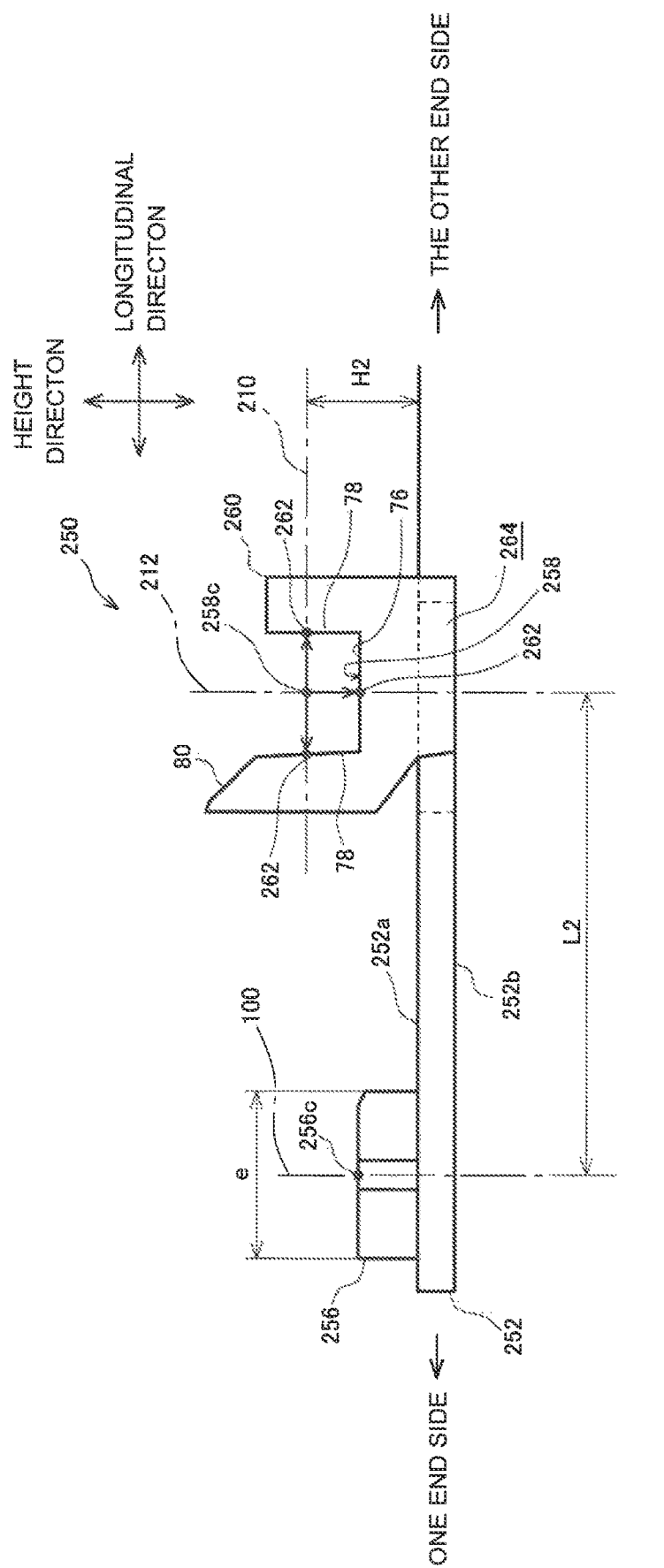
FIG. 20 is a side view showing a jig according to another embodiment where the support groove is a rectangular groove.

Next, another embodiment will be described with reference to FIG. 20. In the description below, the portions that are the same as those included in the jig 50 described with reference to FIGS. 3 to 6 are assigned the same reference numerals as in FIGS. 3 to 6 (but in the 200s), and their description be omitted. A jig 250 shown in FIG. 20 is obtained by making the U-shaped support groove 58 described with reference to FIGS. 3 to 6 into a rectangular support groove 258. The virtual center 258c may be a point at which the distances S2 from a bottom surface 76 and a side surface 78 of the support groove 258 to the point are equal to the radius R1 of the outer surface of the inner cylinder 46 of the carrier bush 28. In FIG. 20, a dot-and-dash line 210 indicates a height direction center line of the support groove 258 passing through the virtual center 258c, and a dot-and-dash line 212 indicates a longitudinal center line of the support groove 258 passing through the virtual center 258c.

In the present embodiment, when a base 252 of the jig 250 is pushed up from below, it is possible to support the outer surface of the inner cylinder 46 of the carrier bush 28 by the bottom surfaces 76 and the side surfaces 78 of the support grooves 258 and prevent the inner cylinder 46 from being shifted in the longitudinal direction of the base 252. It is therefore possible to easily insert the bolt 34 into e center hole 30 of the carrier bush 28 and the bolt holes 32 of the lower arm 20.

Also in the present embodiment, when the base 252 of the jig 250 in contact with the bottom surface 36 of the lower arm 20 is jacked up from below, the outer surface of the inner cylinder 46 on both axial end sides respectively contacts the pair of support grooves 258 at the contact points 262 on the bottom surfaces 76 and the side surfaces 78, and the outer surface of the inner cylinder 46 of the carrier bush 28 can thus be supported from both axial end sides. It is therefore possible to reduce the lateral force applied from the carrier bush 28 to the bolt 34 and extract the bolt 34 easily.

Furthermore, for example, by providing an inclined surface 80 extending upward from the tip of the support groove 258 as shown in FIG. 20, it is possible to guide the inner cylinder 46 of the carrier bush 28 to the bottom surface 76 of the support groove 258, thereby easily guiding the carrier bush 28 such that the position of the center hole 30 of the carrier bush 28 coincides with the position of the virtual center 258c of the support groove 258 of the jig 250.

Supplement to Embodiments

Although the embodiments of the present disclosure have been described, the present disclosure is not limited to the above embodiments, and it should be understood that various modifications may be made other than the above within the scope not departing from the spirit of the disclosure.

The invention claimed is:

1. A jig for assisting attachment and removal of a bolt, the bolt being inserted into a center hole of an inner cylinder included in a carrier bush and bolt holes opposed to each other to fasten a carrier and a lower arm, the inner cylinder being attached to the carrier via a rubber bush, the bolt holes being provided in tip portions of the lower arm that are located on both axial sides of the carrier bush, the jig having:
a base held in contact with a bottom surface of the lower arm;
a fitting portion provided on the base and fitted into a fitting receiving portion of the lower arm to position the base with respect to the lower arm; and
inner cylinder guides that stand on both side edges of the base and are penetrable into an inner tip portion of the lower arm, wherein:
the inner cylinder guides have support grooves for supporting both ends of the inner cylinder; and
a center line of the inner cylinder coincides with a center line of the bolt holes of the lower arm when the support grooves support the inner cylinder.

2. The jig according to claim 1, wherein:
the support groove has a virtual center at which, when an outer surface of the inner cylinder contacts the support groove, the distances from a plurality of contact points to the virtual center are equal to the radius of the outer surface of the inner cylinder;
the height from a surface of the base to the virtual center is equal to the height from the bottom surface to the center of the bolt hole of the lower arm; and
the longitudinal distance of the base from the fitting portion to the virtual center is equal to the longitudinal distance of the lower arm from the fitting receiving portion to the center of the bolt hole of the lower arm.

3. The jig according to claim 1, wherein the support groove is a U-shaped groove having an arc-shaped bottom portion.

4. The jig according to claim 3, wherein the width of the U-shaped support groove is increased from the bottom portion toward the opening side.

5. The jig according to claim 2, wherein:
the support groove is a V-shaped groove; and
the virtual center is a point at which the distances from two supporting points of the V-shaped groove to the point are equal to the radius of the outer surface of the inner cylinder.

6. The jig according to claim 2, wherein:
the support groove is a rectangular groove; and
the virtual center is a point at which the distances from a bottom surface and a side surface of the rectangular groove to the point are equal to the radius of the outer surface of the inner cylinder.

7. The jig according to claim 2, wherein:
the fitting receiving portion is a lightening hole provided in the bottom surface of the lower arm; and
the fitting portion is a protrusion that is provided on the surface of the base and is inserted into the lightening hole.

8. The jig according to claim 2, wherein:
the fitting receiving portion is a protrusion provided on the bottom surface of the lower arm; and
the fitting portion is a hole that is provided in the surface of the base and is fitted onto the protrusion.

9. A method of attaching and removing a bolt using a jig, the bolt being inserted into a center hole of an inner cylinder included in a carrier bush and bolt holes opposed to each other to fasten a carrier and a lower arm, the inner cylinder being attached to the carrier via a rubber bush, the bolt holes being provided in tip portions of the lower arm that are located on both axial sides of the carrier bush, the method comprising:
preparing the jig, the jig having:
a base held in contact with a bottom surface of the lower arm;
a fitting portion provided on the base and fitted into a fitting receiving portion of the lower arm to position the base with respect to the lower arm; and inner cylinder guides that stand on both side edges of the base and are penetrable into an inner tip portion of the lower arm, the inner cylinder guides having support grooves for supporting both ends of the inner cylinder, a center line of the inner cylinder coinciding with a center line of the bolt holes of the lower arm when the support grooves support the inner cylinder;

after preparation of the jig, the method further comprises:

attaching the jig by fitting the fitting portion of the jig into the fitting receiving portion of the lower arm;

pushing up a back side of the base of the attached jig together with the lower arm with a jack;

holding the outer surface of the inner cylinder by the support grooves of the inner cylinder guides; and attaching and removing the bolt while holding the inner cylinder by the support grooves.

\* \* \* \* \*